United States Patent [19]
Shashidhar et al.

[11] Patent Number: 6,156,232
[45] Date of Patent: Dec. 5, 2000

[54] LIQUID CRYSTAL COMPOSITION AND ALIGNMENT LAYER

[75] Inventors: Ranganathan Shashidhar, Springfield; Kirsten A. Grueneberg, McLean; Banahalli R. Ratna, Springfield, all of Va.; Jeffrey M. Calvert, Acton, Mass.; Joel M. Schnur, Burke, Va.; Mu-San Chen, Elicott City, Md.

[73] Assignees: Geo-Centers, Inc., Newton Centre, Mass.; The United States of America as represented by the Secretary of the Navy, Washington, D.C.

[21] Appl. No.: 09/246,216

[22] Filed: Jan. 20, 1999

Related U.S. Application Data

[63] Continuation of application No. PCT/US97/13022, Jul. 24, 1997
[60] Provisional application No. 60/022,588, Jul. 25, 1996.

[51] Int. Cl.[7] .......................... C09K 19/56; G02F 1/135; G02F 1/1337; B32B 27/14; C07F 7/10
[52] U.S. Cl. ........................ 252/299.4; 349/27; 359/183; 428/1.2; 428/1.6; 428/195; 428/447; 556/419; 556/421
[58] Field of Search .................. 252/299.4, 299.01; 428/1.2, 1.6, 447, 195; 349/27; 359/183; 556/419, 421

[56] References Cited

U.S. PATENT DOCUMENTS 5,948,316  9/1999  Shashidhar et al. .................. 252/299.4

FOREIGN PATENT DOCUMENTS 1 495 548  12/1967  France .
22 17 158  11/1972  Germany .

OTHER PUBLICATIONS

Supplementary European Search Report dated Aug. 20, 1999 (EPO Forms 1507.4 and 1503 03.82).
CA 113: 211512, 1990.
CA 104: 197598, 1985.
CA 94: 156489, 1980.

*Primary Examiner*—Shean C. Wu
*Attorney, Agent, or Firm*—Peter F. Corless; Christine C. O'Day; Edwards & Angell, LLP

[57] ABSTRACT

A surface for the alignment of liquid crystals containing directionally-linked groups and compounds useful for preparing such surfaces are disclosed.

29 Claims, 26 Drawing Sheets

13F

8C

3FP

C3

ABTE

APS

EDA

DETA

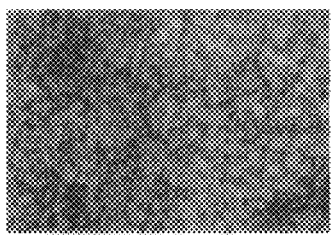
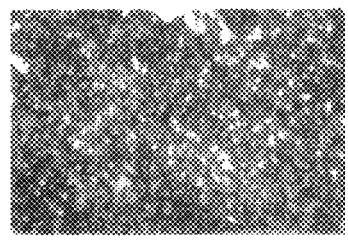
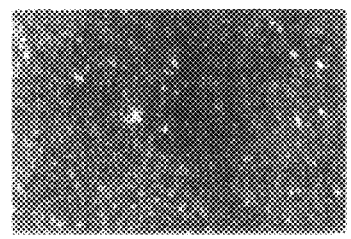
ABTE  
CROSSED POLARIZERS, LC DIRECTOR PARALLEL TO POLARIZER
FIG. 4D
EDA  
CROSSED POLARIZERS, LC DIRECTOR PARALLEL TO POLARIZER
FIG. 4E
DETA  
CROSSED POLARIZERS, LC DIRECTOR PARALLEL TO POLARIZER
FIG. 4F

CINNIMAYL CHLORIDE    AMINE CONTAINING SILANE hν, λ = 320nm

β-TRUXIAMIDE

LC DIRECTOR PARALLEL TO POLARIZER
CROSSED POLARIZERS

LC DIRECTOR 45° TO POLARIZER
CROSSED POLARIZERS

Substrates: ITO with 690 Å of SiO₂, partially treated with DP layer

Between crossed polarizers

Substrates: ITO with 690 Å of SiO₂, partially treated with DP layer

Between parallel polarizers

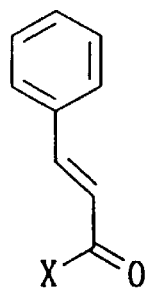 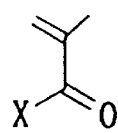 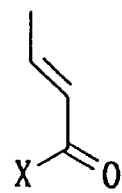 
FIG.13A  FIG.13B  FIG.13C  FIG.13D
   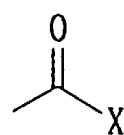
FIG.13E  FIG.13F  FIG.13G  FIG.13H
  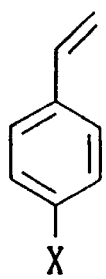
FIG.13I  FIG.13J  FIG.13K

I. SYNTHESIS OF CHROMOPHORES

R=NO$_2$, OCH$_3$

CONFIGURATION OF POLARIZERS AND CELL

DEPENDENCE OF TRANSMITTANCE T ON ROTATION ANGLE Θ

| CHROMOPHORE | PRETILT/° FOR E7 |
|---|---|
| 5d | 2 |
| 5f | 1.5 |
| 5e | 0.9 |
| 5c | 0.5 |

FIG.24

| CHROMOPHORE | PRETILT/° FOR ZLI 4792 |
|---|---|
| 5d | 0 |
| 5f | 0 |
| 5e | 0 |
| 5d/5c (1:1) | 0.3 |
| 5c | 0.6 |

FIG.25

| CHROMOPHORE | PRETILT/° FOR E7 | PRETILT/° FOR ZLI 4792 |
|---|---|---|
| 5a, n=1 | 1° | 0.1° |
| 5a, n=4 | 0.2° | 0.5° |
| 5a, n=6 | 0° | 1.7° |

| CHROMOPHORE | PRETILT/° FOR ZLI 4792 |
|---|---|
| 5b | 0.4 |
| 5g | 2.1 |
| 5h | 1.6 |
| 5i | 1.4 |

FIG. 28

LIQUID CRYSTAL COMPOSITION AND ALIGNMENT LAYER

This application is a continuation of copending application International Application PCT/US97/13022 filed on Jul. 24, 1997 and which designated the U.S., which is a continuation-in-part of U.S. provisional application Ser. No. 60/022,588, filed Jul. 25, 1996, both of which applications are incorporated herein by reference.

BACKGROUND OF THE INVENTION

1. Field of the Invention

The present invention relates to a new directionally-linked surface useful for the alignment of liquid crystals. Methods of preparing this new surface are also described, as is a preferred method wherein a polymerizable self-assembled and high resolution-patternable sorbed layer is polymerized by polarized radiation. Thus, the present invention relates to the development of a new alignment process for liquid crystals which does not require mechanical rubbing and which is suitable for large area flat panel displays. The process creates, by a combination of chemisorption and photopolymerization, an anisotropic surface with "molecular grooves" which guide the liquid crystal molecules in their orientation. The present invention also provides new compounds for use in the present surfaces and process.

2. Background

Flat panel liquid crystal (LC) display devices typically require substrates which provide for the uniformly planar and uniaxial orientation of liquid crystalline molecules. Currently, such alignment is achieved by initially spin coating a polymer (polyamide, polyimide, etc.) on a substrate followed by mechanical rubbing of the polymer surface with cotton, rabbit fur, etc. This technique has inherent problems, however, in that it is difficult to obtain a predictably uniform alignment over large areas. In addition, rubbing creates both charges and dust. These charges in turn lead to the failure of LC devices due to, e.g., shorting of conducting surfaces, etc., and dust can provide defect sites. There is, therefore, a current industrial need for a surface that promotes uniaxial liquid crystal alignment (i.e., both planar alignment (an alignment orientation where the long axis (or average director) of the liquid crystal is not perpendicular to the plane of the substrate surface), and homeotropic alignment, where liquid crystal molecules are perpendicular to the substrate surface) without the need to mechanically rub the surface of a substrate, and for a simple technique for producing such a surface. Colorless substrates that align liquid crystalline molecules are also desirable for high contrast applications, etc.

Current approaches for addressing the problems encountered with rubbed surfaces include the coating of Langmuir-Blodgett (LB) layers on substrates, and the polymerization or irradiation of substrates that have been coated with polymers with polarized light.

In the LB film approach, major difficulties are encountered which have not yet been overcome: (i) it is very difficult to scale-up an LB process for manufacturing purposes, and (ii) a useful aligning layer is fabricated only via the layer-by-layer deposition of monolayers onto a substrate at the air-water interface of an LB trough. Since the monolayer present at the air-water interface in an LB trough is not in its thermodynamically stable state, the aligning layer obtained does not have long term mechanical and thermal stability.

LB layers also generally contain inhomogeneities or domains of defects within the plane of the film. This makes it difficult to obtain the uniaxial alignment of a liquid crystal compound over a large area. Moreover, LB films are known to have a considerable degeneracy with regard to the tilt of the LB-forming molecules within the plane of the film. As a consequence, it is not possible to obtain specific pre-tilt directions at the substrate surface.

Alternative approaches like spin cast conducting polymer films are being investigated. In the case of conducting polymer approach, films of the conducting polymer, the idea is to replace the polyimide layer by the conducting polymer as the aligning layer. This approach is yet to demonstrate its feasibility for uniformity of alignment.

Thus, there is a current need for a new non-rubbing alignment process which is reproducible, applicable to both TN and STN devices and which can be easily scaled-up and inserted into the existing technology/manufacturing process.

Hercules (U.S. Pat. No. 5,032,009; U.S. Pat. No. 4,974,941; U.S. Pat. No. 5,073,294; Nature, Vol 351, 49 May 1991; Liquid Crystals, Vol. 12, No. 5, 869, 1992; Newsletter of the Int. Liq. Crystl. Soc., ("Liquid Crystals Today"), Vol. 4, No. 2 1994, all incorporated herein by reference) has reported the alignment of liquid crystals optionally containing dyes with polarized light and the preparation of a surface made of an isomerizable dye which is first dispersed in a polymer and subsequently irradiated with polarized light. Neither the liquid crystal itself, dye, nor host polymer is covalently bound to the substrate, and the aligning surface is unstable: heat and/or subsequent irradiation changes or erases any initially obtained orientation aligning effect.

Schadt et al (Jpn. J. Appl. Phys., Vol. 31, Pt 1, No. 7, p. 2155 (1992); EP 525,477; EP 525,473 and EP 525,478, all incorporated herein by reference) has also reported aligning surfaces prepared by the irradiation of polymers having, attached to the polymer backbone, pendant polymerizable groups, using polarized light. These surfaces require pre-polymerization, however, and, like those described above, are not covalently bound to a substrate surface. Moreover, when polymer layers like those of Schadt and Gibbons are made thin to lower the driving voltage, pinholes arise which cause defects and shorts.

Finally, Ichimura (Abstract from the Tawiguchi Conference, (Japan), 1994, incorporated herein by reference) has used polarized light to orient polymers bearing side chain azobenzenes. The polymers were applied to substrates using an LB technique and a spin-coating technique, and showed alignment of liquid crystals in contact therewith. However, these films, like those of Schadt and Gibbons, are not bound to the substrate surface, and they suffer from the general drawbacks discussed above for such films as well as those discussed regarding LB films.

Thus, there remains a need for a tough new, non-rubbed, non-LB based alignment surface which can be easily produced and used in liquid crystal devices which require alignment layers. The present invention provides such a surface.

There also remains a need for new compounds useful in the present surfaces and methods.

SUMMARY OF THE INVENTION

Accordingly, it is one object of the present invention to provide a surface for the uniaxial planar alignment, homeotropic alignment, etc., of liquid crystalline molecules in contact therewith, the pre-tilt angle θ of aligned liquid crystals varying from 0°<θ<90° (measured as the angle the long axis (director) of the liquid crystalline molecule makes with the surface plane of the substrate).

It is another object of the present invention to provide liquid crystal display devices, spatial light modulators, phase modulators, non-linear optical devices, etc., comprising substrates which provide uniaxial planar alignment, homeotropic alignment, etc., of liquid crystalline molecules in contact therewith.

It is another object of the present invention to provide a simple method for producing a surface that provides for the uniaxial planar alignment, homeotropic alignment, etc., of liquid crystalline molecules in contact therewith.

It is another object of the present invention to provide an alignment surface for liquid crystals that is colored or colorless, that provides for the control of the pretilt angle θ of liquid crystal molecules in contact therewith from 0° to 9°, and which provides uniaxial planar alignment (meaning that for all θs other than 0° and 9° all or substantially all of the liquid crystalline molecules in contact with the surface tilt in the same direction.

It is another object of the present invention to provide novel compounds useful in the present surfaces and methods.

It is another object of the present invention to provide novel compounds which afford surfaces with improved pretilt properties.

These and other objects, which will become apparent after a review of the following detailed description, have all been achieved by the inventors' discovery of a surface containing anisotropic chemical and, it is thought, geometric features which guide liquid crystalline molecules in contact therewith in preferred orientations and with tilt angles Θ of from 0° to 90°.

The inventors have also discovered that compounds of the formula

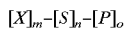

in which
X is a chemical functional group capable of adsorption, absorption, or chemisorption to a surface or a substrate,
S is a spacer, and
P is a directionally linkable group of the formula (I):

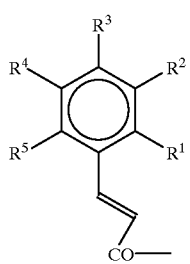

wherein each of $R^1$, $R^2$, $R^3$, $R^4$, and $R^5$ is H, $C_nH_{2n+1}$, $OC_nH_{2n+1}$, or $NO_2$, where n is an integer of 1 to 8, provided that not all of $R^1$, $R^2$, $R^3$, $R^4$, and $R^5$ are H, and n, m, and o of the formula $[X]_m-[S]_n-[P]_o$ are all integers greater than or equal to 1, and m≧n and o≧n, afford surfaces exhibiting improved pretilt properties.

Also preferred are compounds of the formula

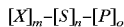

wherein X and S are each the same as defined above, and P is a directionaly linkable group, and n of formula 1 is either 0 or an integer greater than or equal to 1, m and o are each integers greater than or equal to 1, wherein m>n of formula 1 and o>n of formula 1, and wherein P has the following formula (IA):

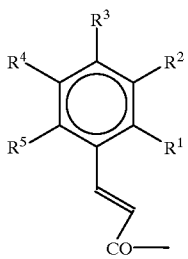

(IA)

wherein each of $R^1$, $R^2$, $R^3$, $R^4$, and $R^5$ is H, Br, Cl, F, $CF_3$, CN, NC, linear or branched and racemic or chiral —$CO_2C_nH_{2n+1}$, linear or branched and racemic or chiral $C_nH_{2n+1}$, linear or branched and racemic or chiral $OC_nH_{2n+1}$, $OCH_2C_nF_{2n+1}$, $NO_2$ or OH, where n of such $R^1$–$R^5$ groups is an integer of 1 to 12.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 11:
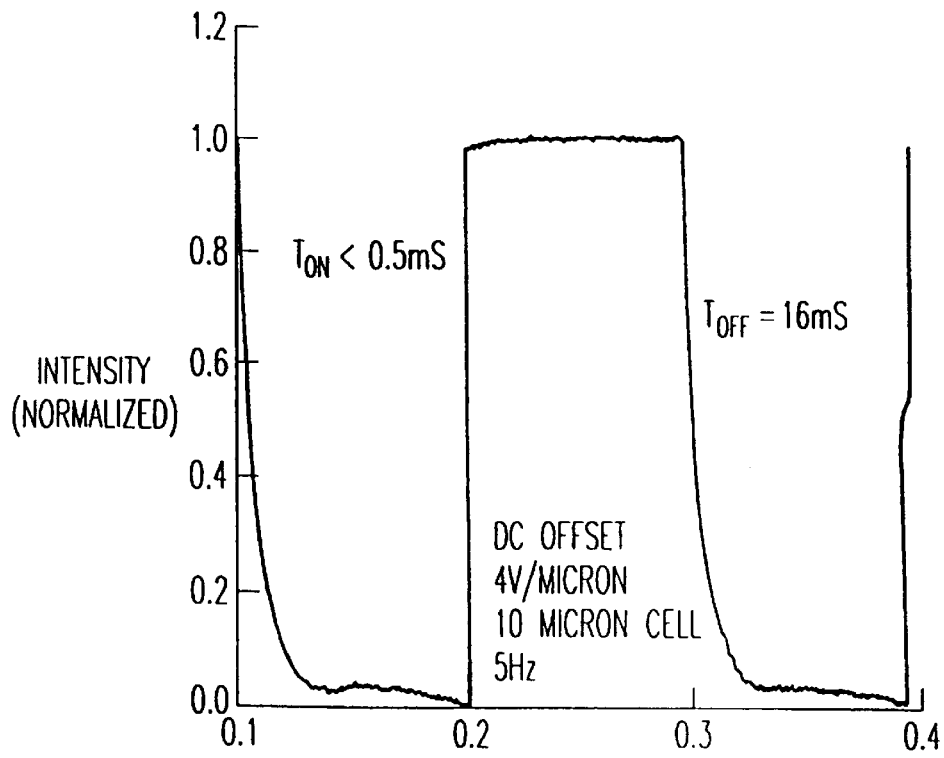
Figure 12:
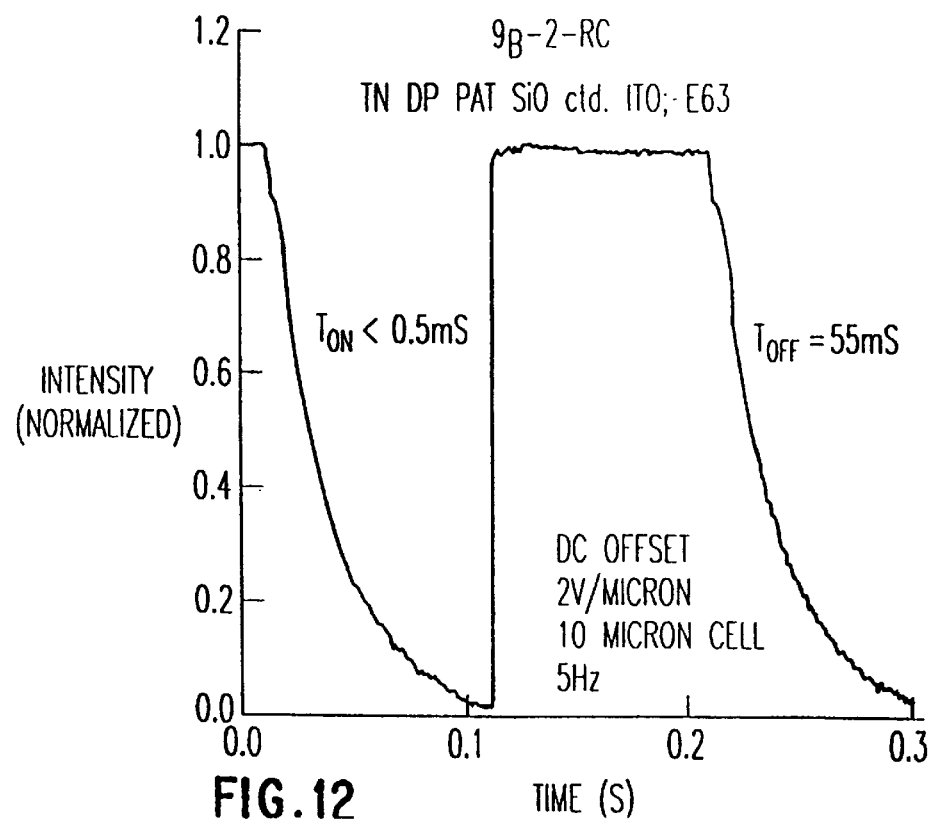
Figure 14:
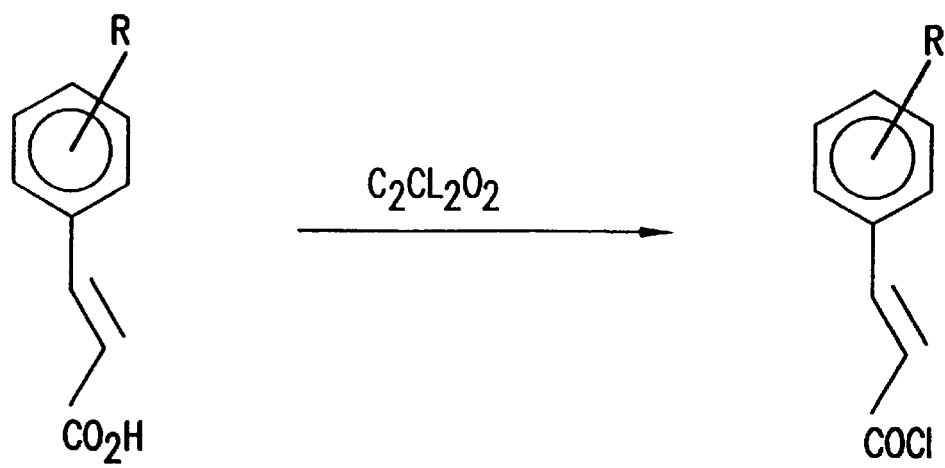
Figure 15:
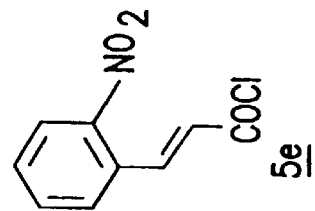
Figure 15:
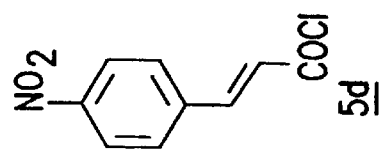
Figure 15:
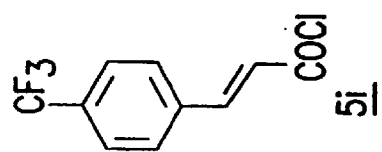
Figure 15:
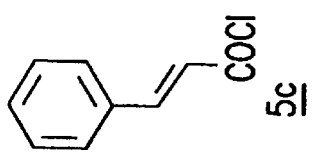
Figure 15:
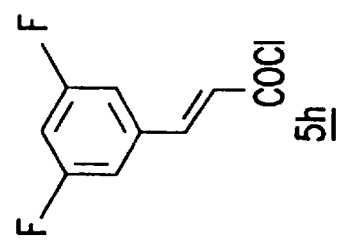
Figure 15:
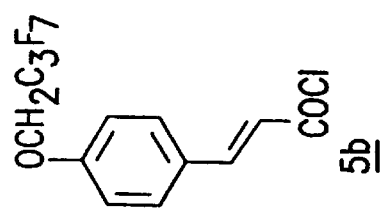
Figure 15:
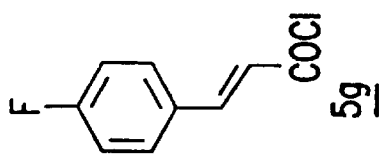
Figure 15:
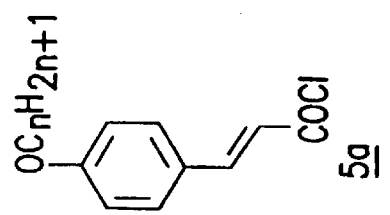
Figure 15:
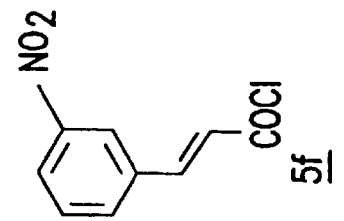
Figure 16:
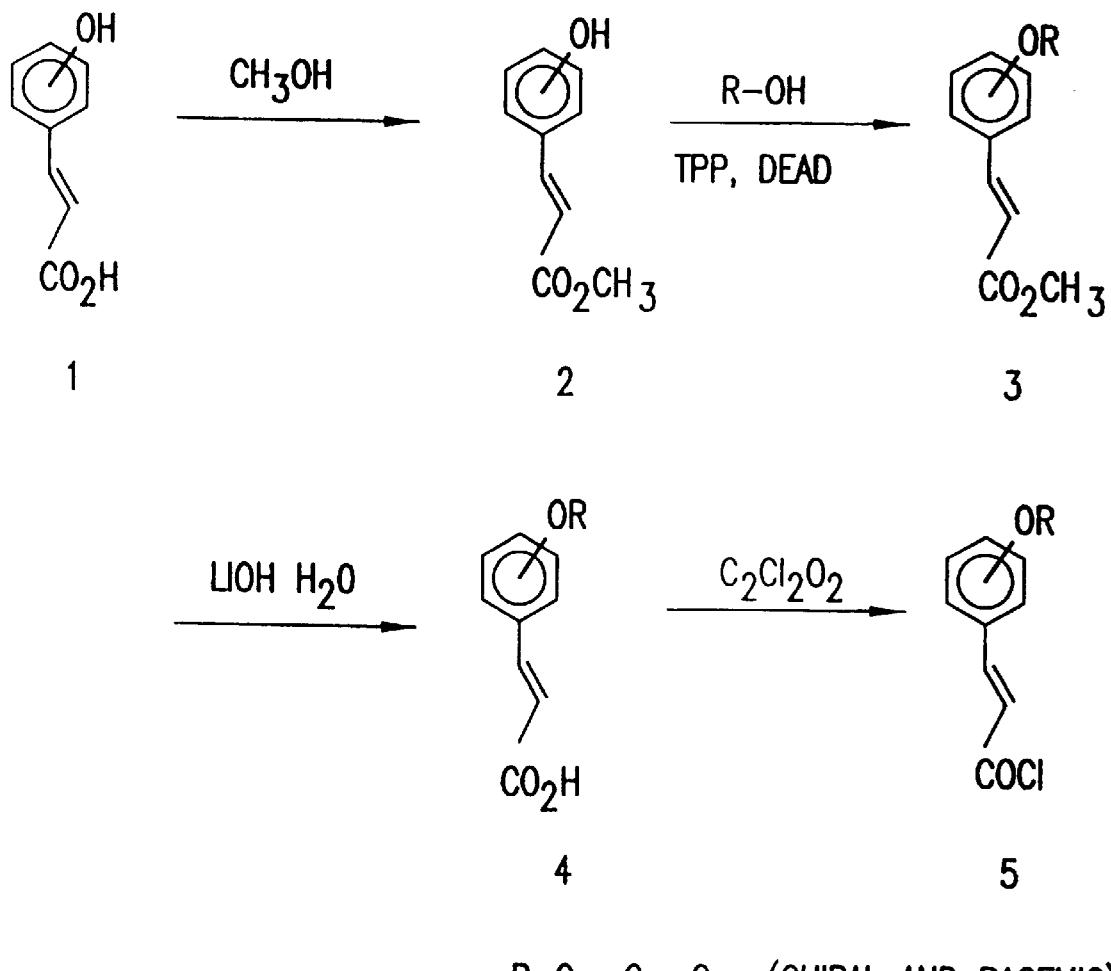
Figure 17A:
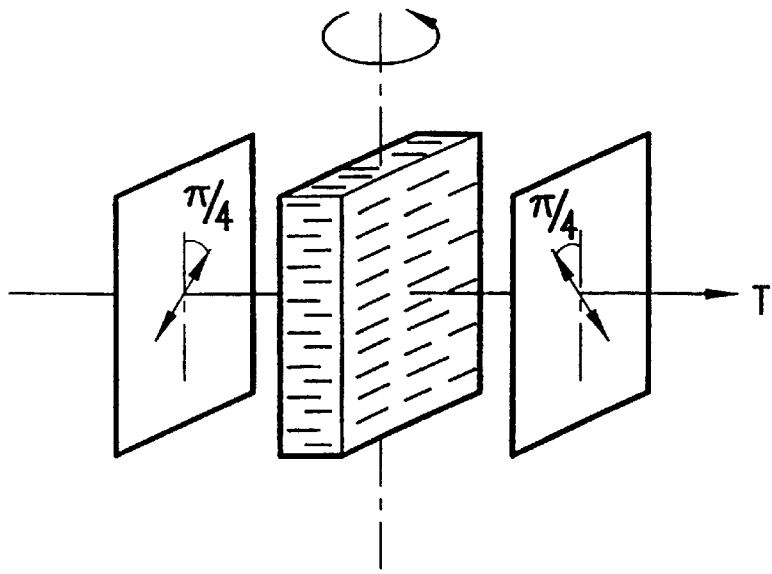
Figure 17B:
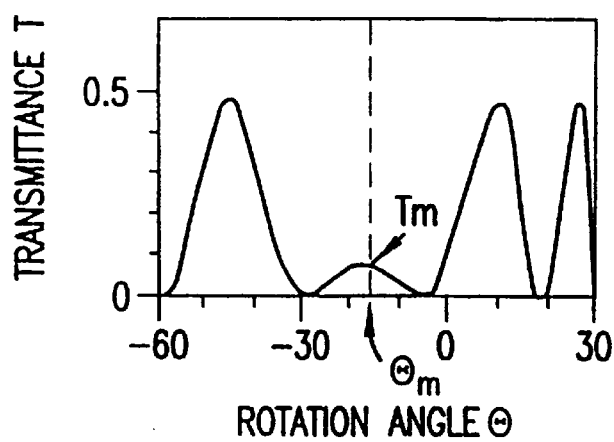
Figure 18:
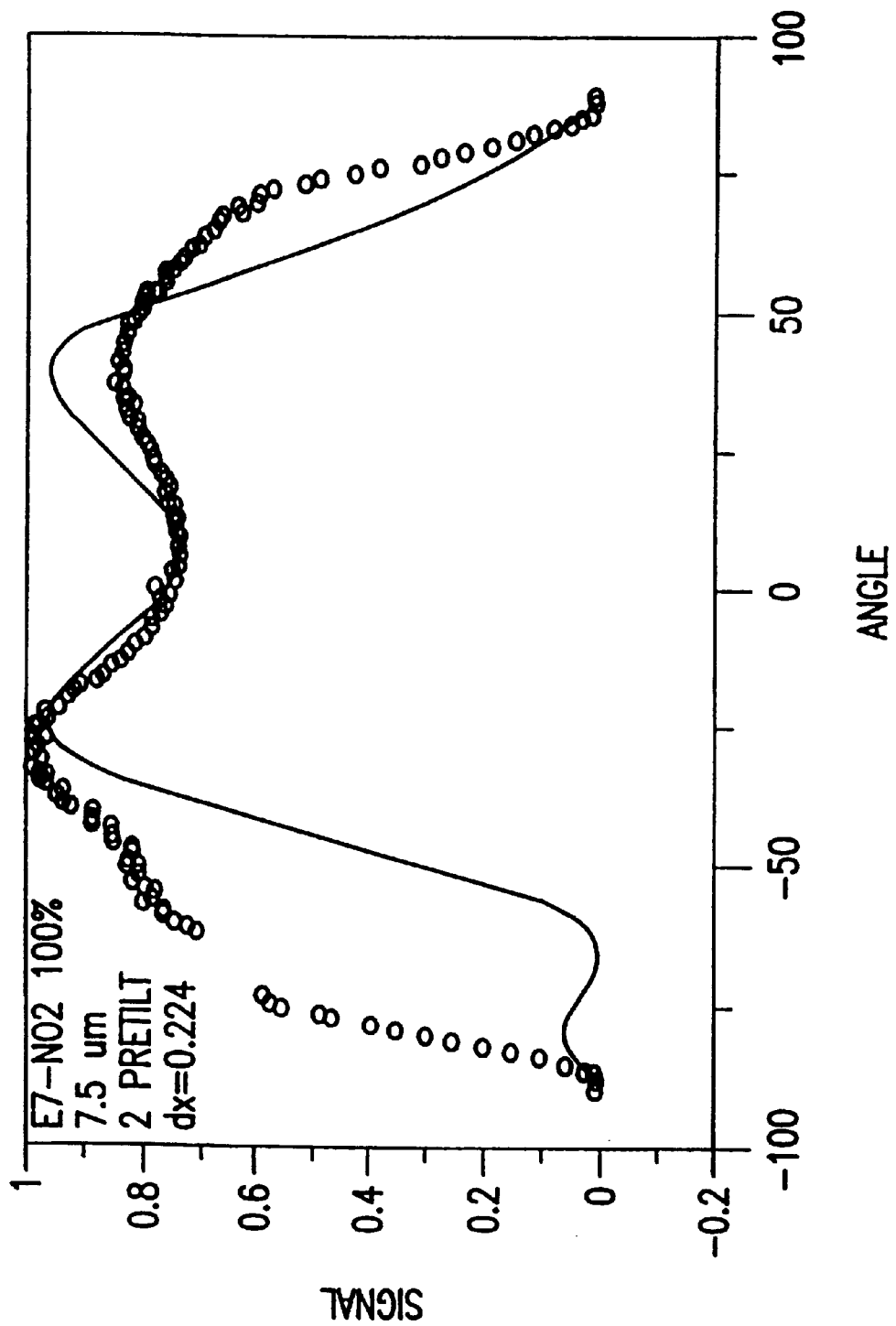
Figure 19:
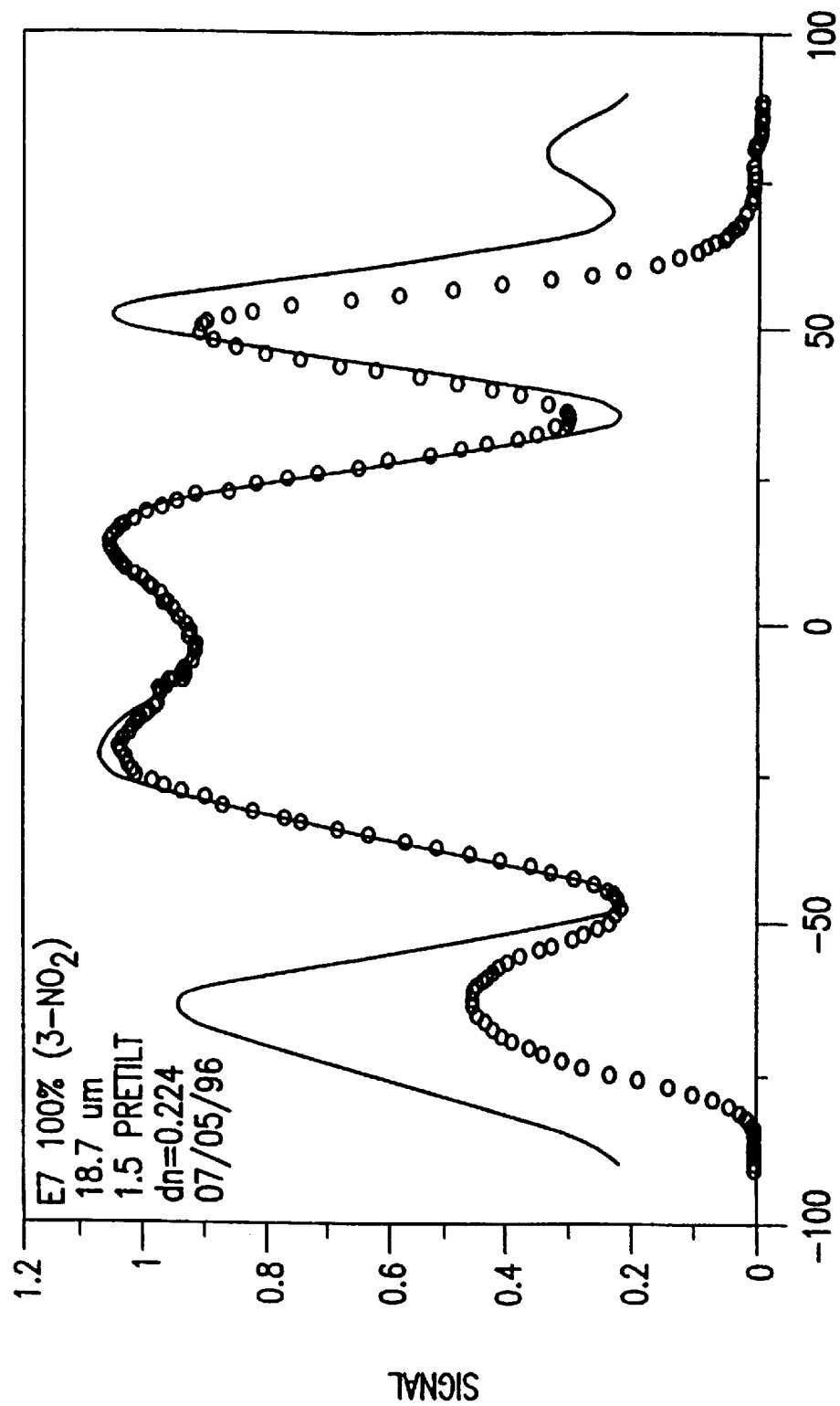
Figure 20:
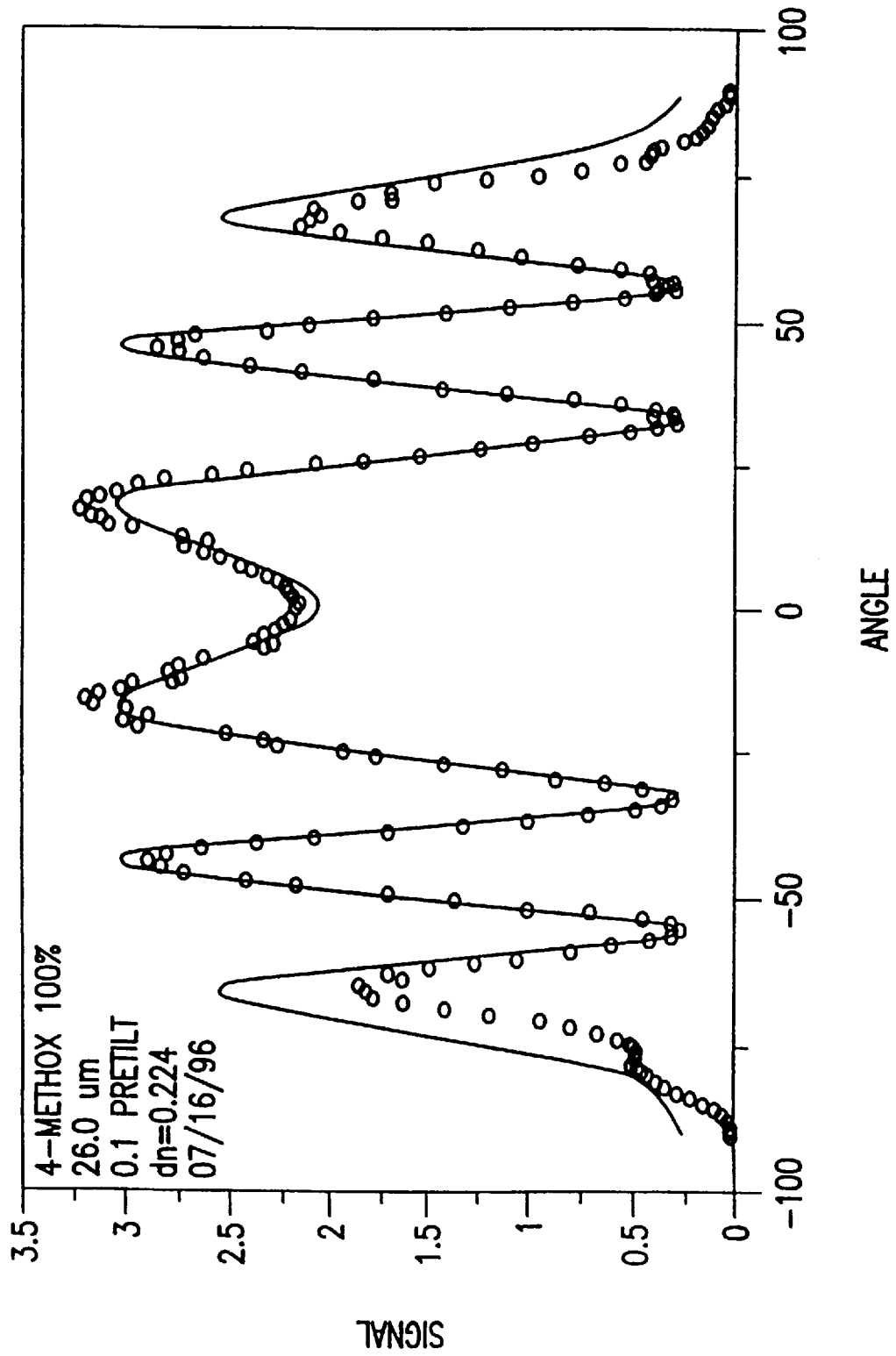
Figure 21:
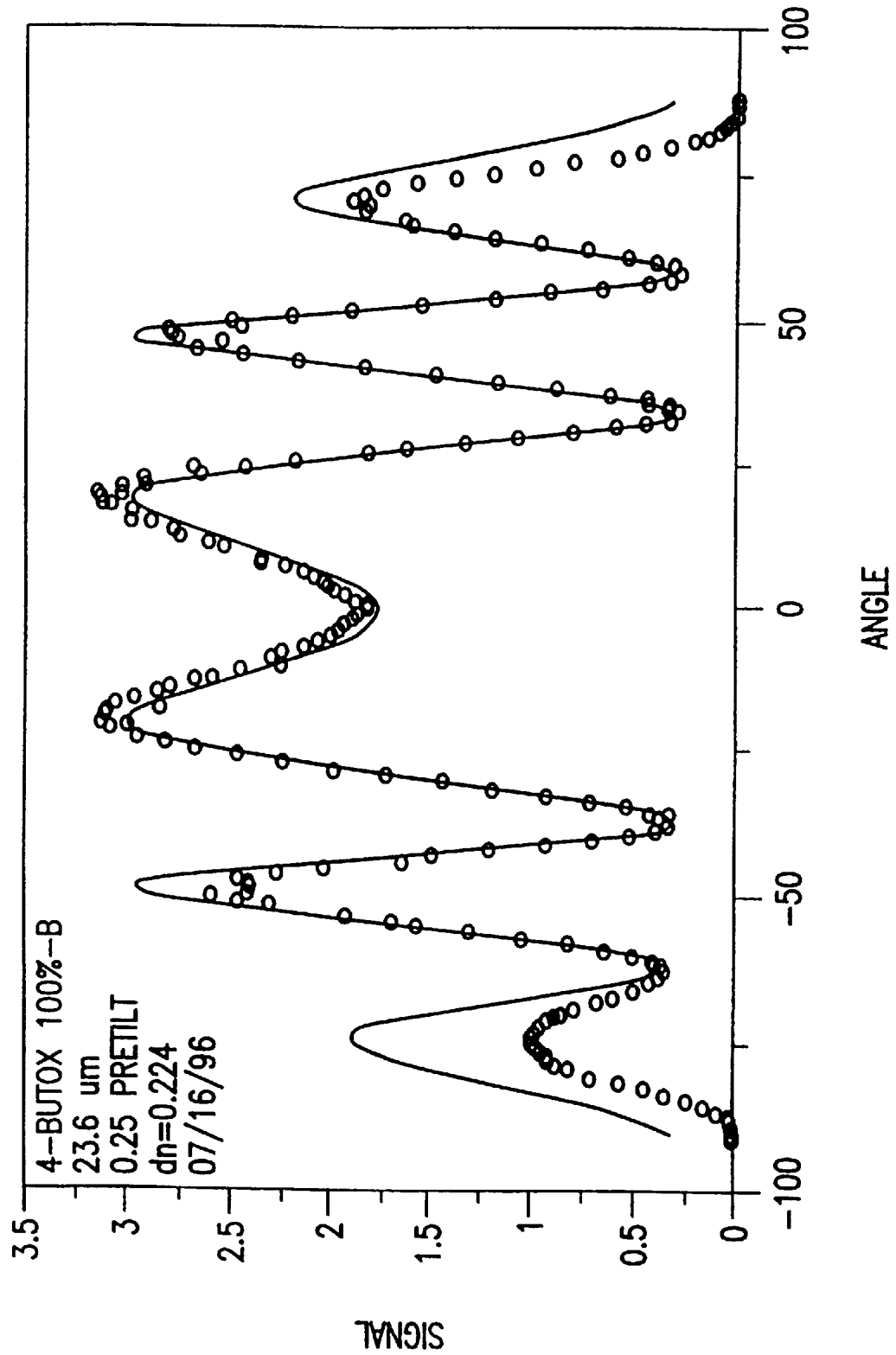
Figure 22:
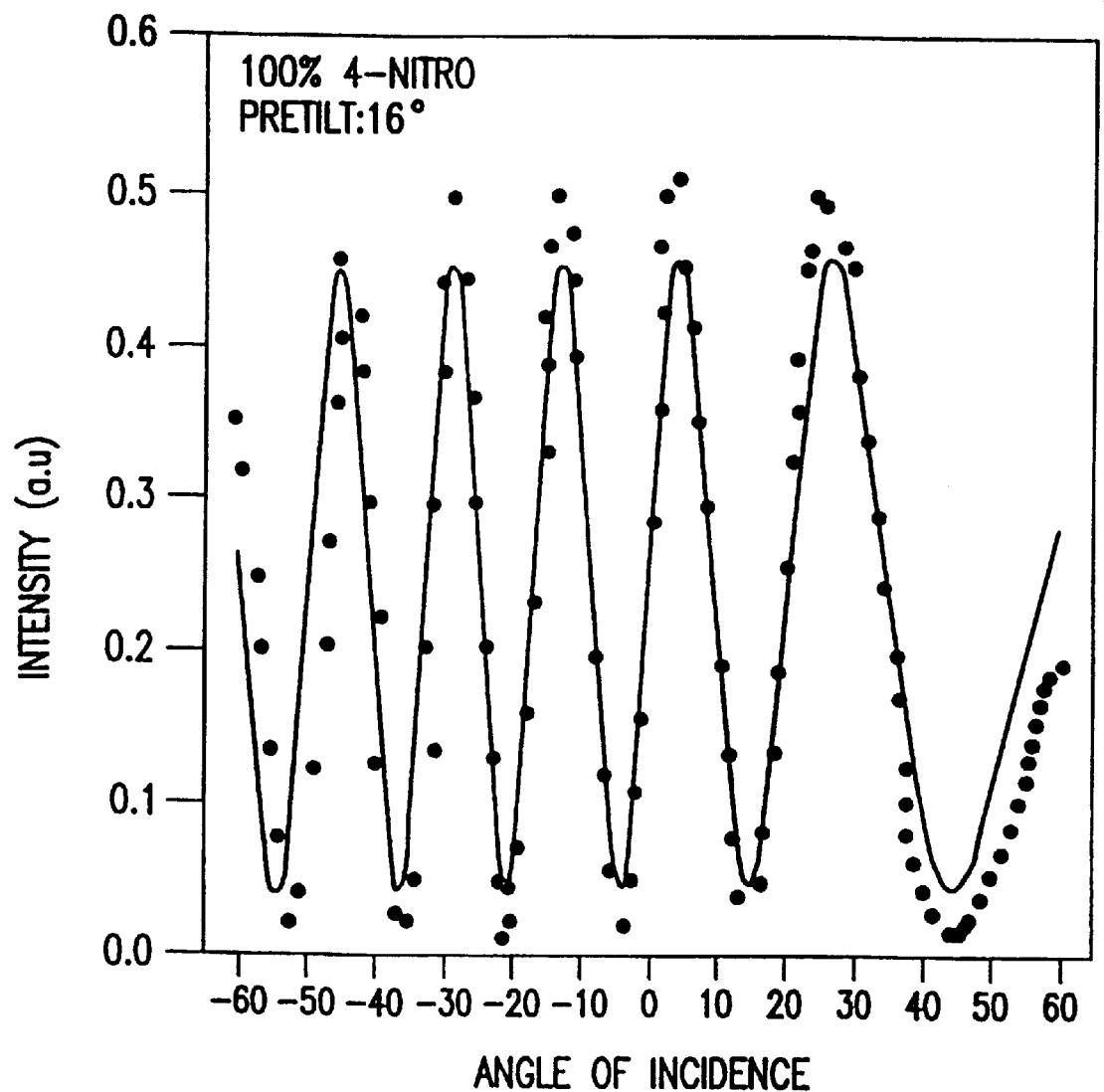
Figure 23:
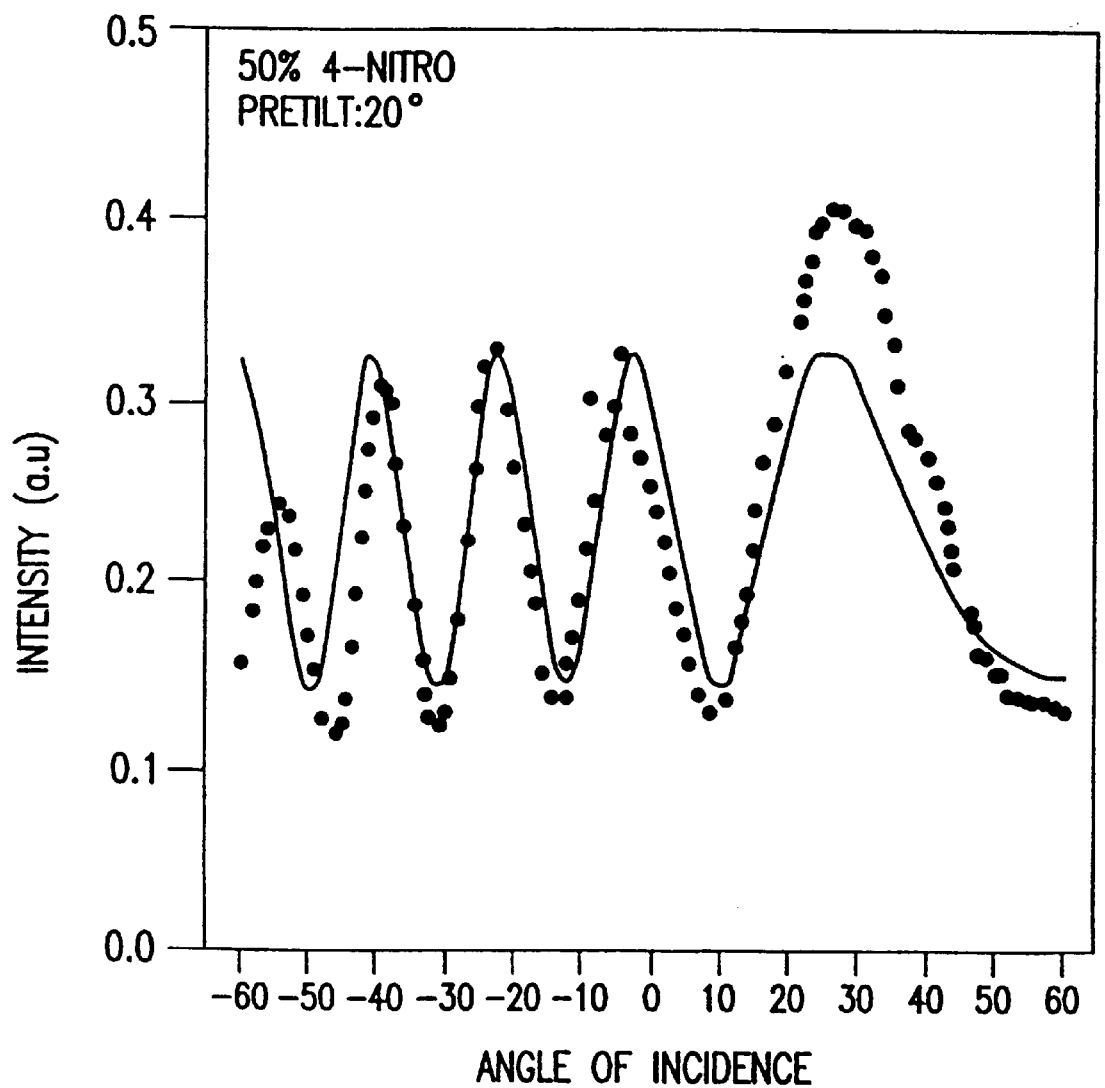
Figures 26, 27:
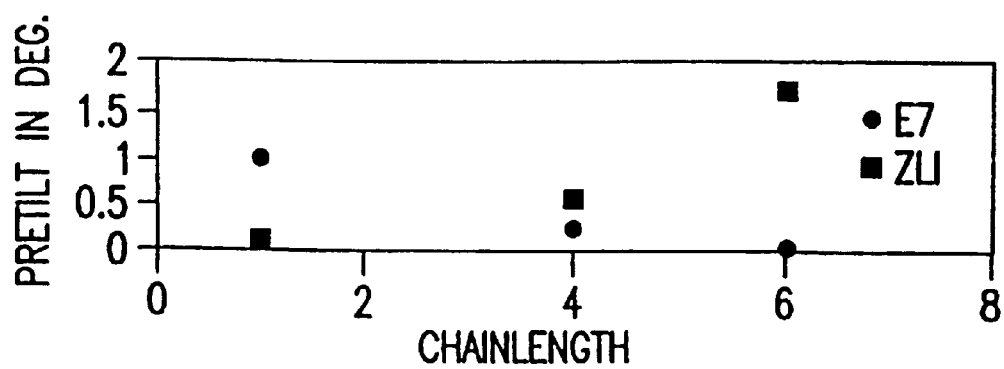

The LC molecules are aligned in a uniform planar orientation in the polymerized regions;

FIG. 11 shows the electrooptic characteristics of a TN cell with a directionally linked coating on the substrates. The underlying substrates consist of bare ITO glass;

FIG. 12 shows the electrooptic characteristics of a TN cell with a directionally linked coating on the substrates. The underlying substrates consist of passivated ITO;

FIG. 13 shows some of the many alternative directionally linkable groups useful in the present surface and method. X represents an absorbable, adsorbable, chemisorbable, etc., end of the molecule. The spaces here is a single bond;

FIG. 14 shows a synthetic scheme for the synthesis of certain compounds of the present invention;

FIG. 15 shows a variety of chromophores synthesized for the modification of the chemisorped layer according to this invention;

FIG. 16 shows a synthetic scheme for the synthesis of certain compounds of the present invention containing directionally linkable moieties;

FIG. 17 shows the experimental design used for measuring the pretilt angle;

FIG. 18 shows the results of a pretilt angle measurement for a surface according to the present invention;

FIG. 19 shows the results of a pretilt angle measurement for a surface according to the present invention;

FIG. 20 shows the results of a pretilt angle measurement for a surface according to the present invention;

FIG. 21 shows the results of a pretilt measurement for a surface according to the present invention;

FIG. 22 shows the results of a pretilt measurement for a surface according to the present invention;

FIG. 23 shows the results of pretilt measurements for different surfaces with different chromophores attached to the chemisorbed layer. The commercially available mixture E7 was used as liquid crystal;

FIG. 24 shows the results of pretilt measurements for different surfaces with different chromophores attached to the chemisorbed layer. The commercially available mixture ZLI 4792 was used as liquid crystal;

FIG. 25 shows the results of pretilt measurements for different surfaces with different chromophores attached to the chemisorbed layer. The commercially available mixtures E7 and ZLI 4792 was used as liquid crystal;

FIG. 26 shows the chainlength dependence of pretilt for the commercially available mixtures E7 and ZLI 4792 using 4-alkoxy chromophores in the alignment layer;

FIG. 27 shows the results of pretilt measurements for different surfaces with different chromophores attached to the chemisorbed layer. The commercially available mixtures E7 and ZLI 4792 was used as liquid crystal.

FIG. 28 shows the results of pretilt measurements of alignment layers with fluorinated substitution.

DETAILED DESCRIPTION OF THE PRESENT INVENTION

The present inventors have discovered that an anisotropic "sorbed" (meaning chemisorbed, adsorbed, absorbed, etc.) directionally linked layer produces a surface having superior alignment properties. Their discovery includes the formation of layers on a substrate surface by chemisorption, optionally followed by chemical modification of the chemisorbed layer by attachment of a directionally linkable group thereto, and, finally, creation of an anisotropic surface by directional linking using, e.g., polarized radiation. Their discovery also includes formation of an alignment layer containing of molecules with both chemisorbable and directionally linkable groups, followed by directional linking using polarized radiation. These processes can create an anisotropic surface aligning layer that provides for the uniform planar alignment of LC molecules without any rubbing.

The invention alignment surface is preferably a directionally-linked layer of molecules adsorbed, absorbed or chemically bonded to a substrate. By "layer" the inventors mean more than one molecule, and the invention is not limited to a monolayer, a continuous layer, etc. Covalent bond formation of the layer molecules to the substrate is preferred (i.e., chemisorption). For example, an —OH group on the surface of a glass substrate provides a site for the attachment of a chemisorbable molecule. Chemisorption therefore, as used herein provides an aligning layer with long-term thermal and mechanical stability. See FIG. 1 for the chemisorption of silanes.

In particular, the present invention alignment surface comprises a directionally linked layer with anisotropic chemical (i.e., molecular) and, it is believed, geometric features. These features are provided by a sorbed (i.e., an adsorbed, absorbed, preferably chemisorbed, etc.) layer or layers which comprise one or more compounds having the following general formula:

$$[X]_m\text{-}[S]_n\text{-}[P]_o \qquad\qquad 1$$

where X is a chemical functional group capable of adsorption, absorption or chemisorption to a surface or substrate, S is a spacer and P is a directionally linkable group.

X is a group that sorbs to surfaces, particularly surfaces and substrates used in devices requiring aligned liquid crystals (e.g., glass; ITO-coated glass; ITO-coated glass with passivation layer, preferably $SiO_2$; ITO-coated plastic; ITO-coated plastic with passivation layer (particularly $SiO_2$), ITO-coated borosilicate; ITO-coated borosilicate with passivation layer (particularly $SiO_2$); polymer surfaces; diamond surfaces; microvoid-containing materials; silicone wafers optionally comprising a predetermined pattern; silicon wafers patterned after adsorption, absorption or chemisorption of the above-described compounds, etc.). It is understand that the above-mentioned passivation layers suitably can be a top layer or below an ITO layer. Of course, substrates other than those currently used in liquid crystalline devices may also be coated with the compounds described above. Examples of useful surfaces include gold, silver, copper, mirror surfaces, $MgF_2$, chromium, platinum, palladium, mica, aluminum oxide, aluminum, amorphous hydrogenated silica, gallium arsenide, polysilicon, sulfides including cadmium sulfide, selenides, silver bromide films, oxidized metal surfaces, metal surfaces, plastic (polymer) surfaces, etc.

Figure 1:
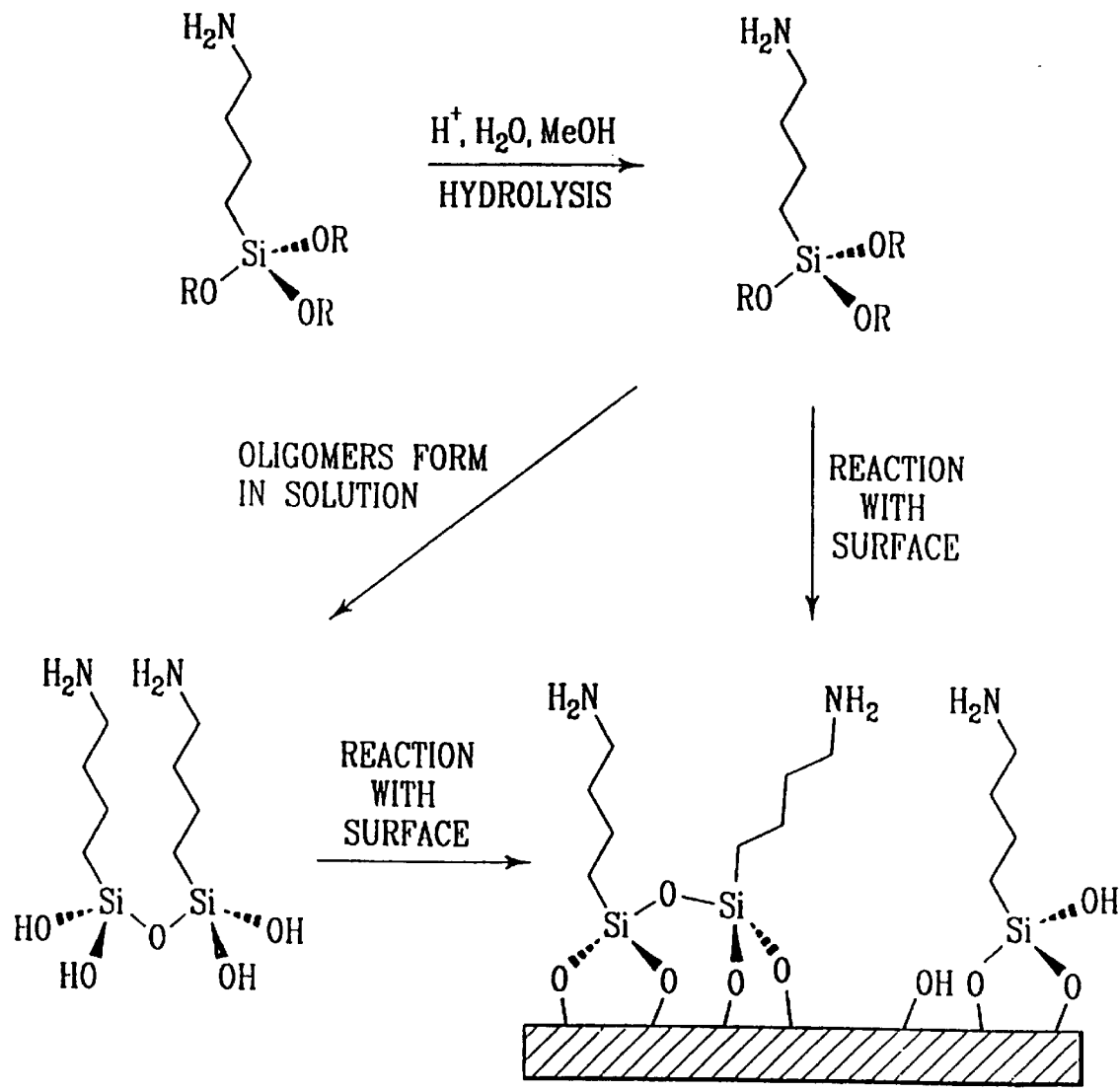
FIG. 1 is a schematic representation of one process of effecting chemisorption of silane molecules onto a surface. A substrate is dipped in a solution containing silane molecules. The silanes covalently attach to the surface.
Figure 2A:
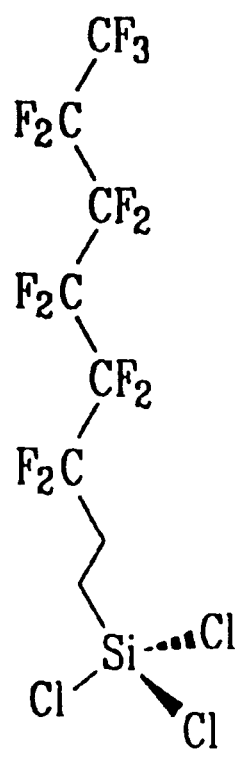
FIG. 2 shows the structures of hydrophobic silanes referred to in the specification. When chemisorbed on a surface, these silanes promote a perpendicular (homeotropic) alignment of LC molecules.
Figure 2B:
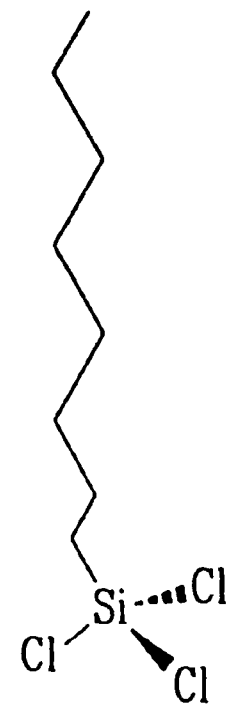
Figure 2C:
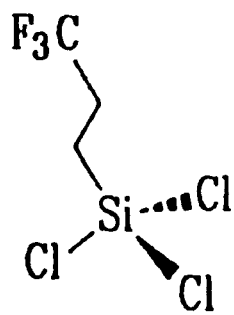
Figure 2D:
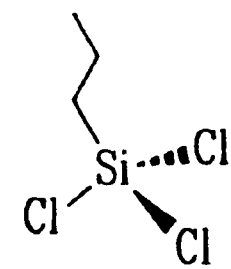
Figure 3A:
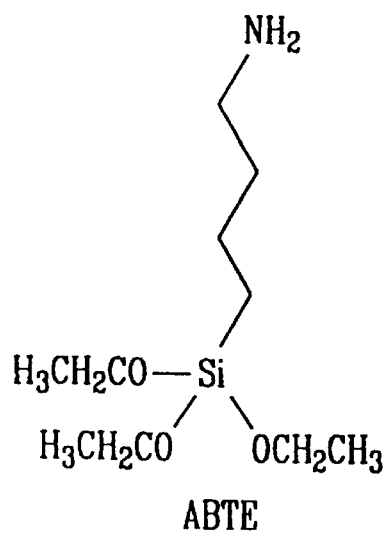
FIG. 3 shows the structures of some hydrophilic silanes investigated for LC alignment. All have a —NH2 (amine) group at the end of the molecule and a trialkoxy silyl group at the other end.
Figure 3B:
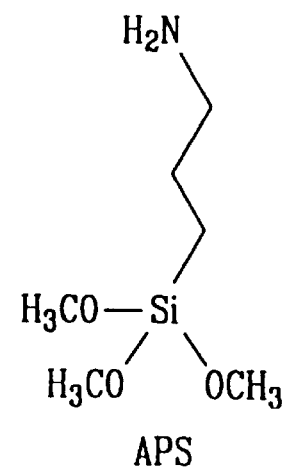
Figure 3C:
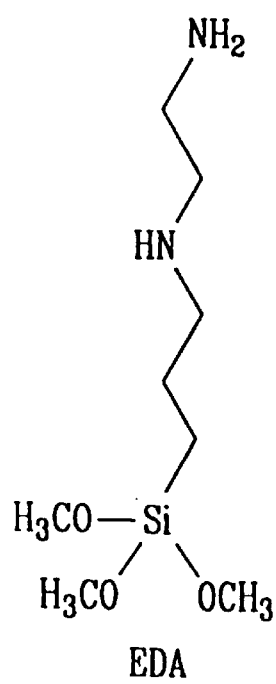
Figure 3D:
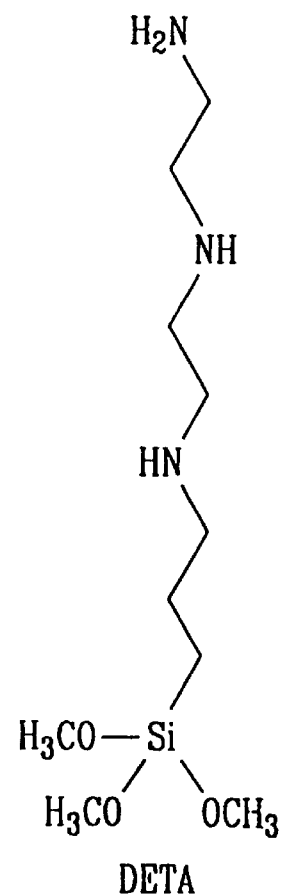

In addition to the silanes depicted in FIG. 1, other suitable X groups include any chemical functional group capable of sorption to the above-described surfaces. Chemical groups capable of covalently bonding to the substrate surface (chemisorption) are preferred. Examples include any group making an Si—O bond with a surface hydroxyl group including for example, —SiR$_2$OH where R is C$_1$–C$_{10}$ alkoxy or C$_1$–C$_{10}$ alkyl, —Si(OH)$_3$, mono/di/trialkoxy silanes such as (C$_1$–C$_{10}$ alkoxy)$_3$SiCl, (C$_1$–C$_{10}$ alkoxy)$_2$SiCl$_2$ or (C$_1$–C$_{10}$ alkoxy)SiCl$_3$, and mono/di/trialkyl silanes such as (C$_1$–C$_{10}$ alkoxy)$_3$SiCl, (C$_1$–C$_{10}$ alkyl)$_2$SiCl$_2$ or (C$_1$–C$_{10}$ alkyl)SiCl$_3$. Other examples of X include a carboxyl (COO) group; phosphorus-containing groups, a thiol group; an alcohol group; a carbonyl group; a (meth)acrylate group; titanates; zirconates; a thiocyanate group; a (meth)acrylic acid group; an isocyanate group; an isothiocyanate group; an acyl cyanate group; an acyl thiocyanate group; etc., each X group being chosen so as to sorb to the desired substrate, preferably chemisorb. Where it is possible, the X group may be chiral (for example, a trialkoxysilane group having different alkoxy group).

It is also possible that a single layer-forming molecule of formula 1 can contain two or more of the above chemically functional X groups, and that one or more than one are used for sorption to the surface. Thus, n in the above formula can be an integer greater than 1, and is preferably from 1–4, most preferably 1 or 2. Further, X groups on different layer-forming molecules can bond to one another while others sorb to the substrate. See FIG. 1 where oligomers form through X groups.

S in the above formula is a spacer group. In addition to the spacer groups described in FIG. 3 (hydrocarbon chains and hydrocarbon chains interrupted by one or two NH groups) other spacer groups may be used. Suitable spacer groups include any chemical moiety that separates X from P and that does not prevent X and P from performing their functions. For example, suitable spacer groups include a single bond and a linear C$_1$–C$_{30}$ or branched C$_3$–C$_{30}$ alkyl group each optionally interrupted, when there are at least two carbon atoms, by one or more aromatic groups, peptide groups, heterocyclic groups, NH, NR where R is a C$_1$–C$_{18}$ hydrocarbon group, O, S, COO, oxygenated sulfur, i.e., SO$_n$ where n is 1–4, CO, phosphorous, oxygenated phosphorous such as phosphine, phosphate, phosphite, etc. group which are preferably non-adjacent. The spacer groups may be optionally substituted, for example, with hydroxyl, nitro, halogen, those substituents listed below, etc. Other suitable S groups include a C$_6$–C$_{70}$ (preferably C$_6$–C$_{12}$, e.g., phenylene, naphthylene, biphenylene, etc.) aromatic group optionally substituted with alkyl, hydroxyl, nitro, halogen, etc., groups, a C$_3$–C$_{30}$ (preferably C$_5$–C$_{30}$) heterocyclic group optionally substituted with alkyl, hydroxyl, nitro, halogen, etc., groups, and a saturated or partially unsaturated C$_3$–C$_{30}$ cyclic hydrocarbon group optionally substituted with hydroxyl, halogen, nitro, etc., groups and including substituted and unsubstituted steroids like cholesterol, etc. It is stressed that any spacer which links X and P and does not negate their functions may be used.

The spacer of the present invention may be chiral. Preferably the spacer separates X from P by from 1 to 1000 angstroms, preferably 2 to 70 angstroms, most preferably 3 to 30 angstroms, including 5, 10, 15, 20 and 25 angstroms and all ranges therebetween, and is chemically tailored to provide a desired pretilt angle θ of preferably uniaxially oriented liquid crystal molecules in contact with the invention surfaces of from $0° \leq \theta < 90°$ (i.e., pure planar to homeotropic alignment).

A layer-forming molecule of formula 1 can bear more than one spacer group and preferably has as many spacers as there are directionally linkable groups. Thus, n is an integer of 1 or more, preferably 1–4, most preferably 1 or 2. Preferably, n is equal to or less than o (the number of P groups).

P in the above formula is a group capable of directionally linking to another P group. Directional linking includes dimerization, oligomerization, polymerization, photoreactions including insertions, isomerizations, Norish I and II reactions, etc. wherein at least two P groups are anisotropically linked. Groups capable of directional charge transfer interactions, ionic bonding, hydrogen bonding etc. are also included. P groups encompass all functional groups capable of being directionally (i.e., anisotropically) linked to another, preferably to a close-by or neighboring P group.

Figure 5:
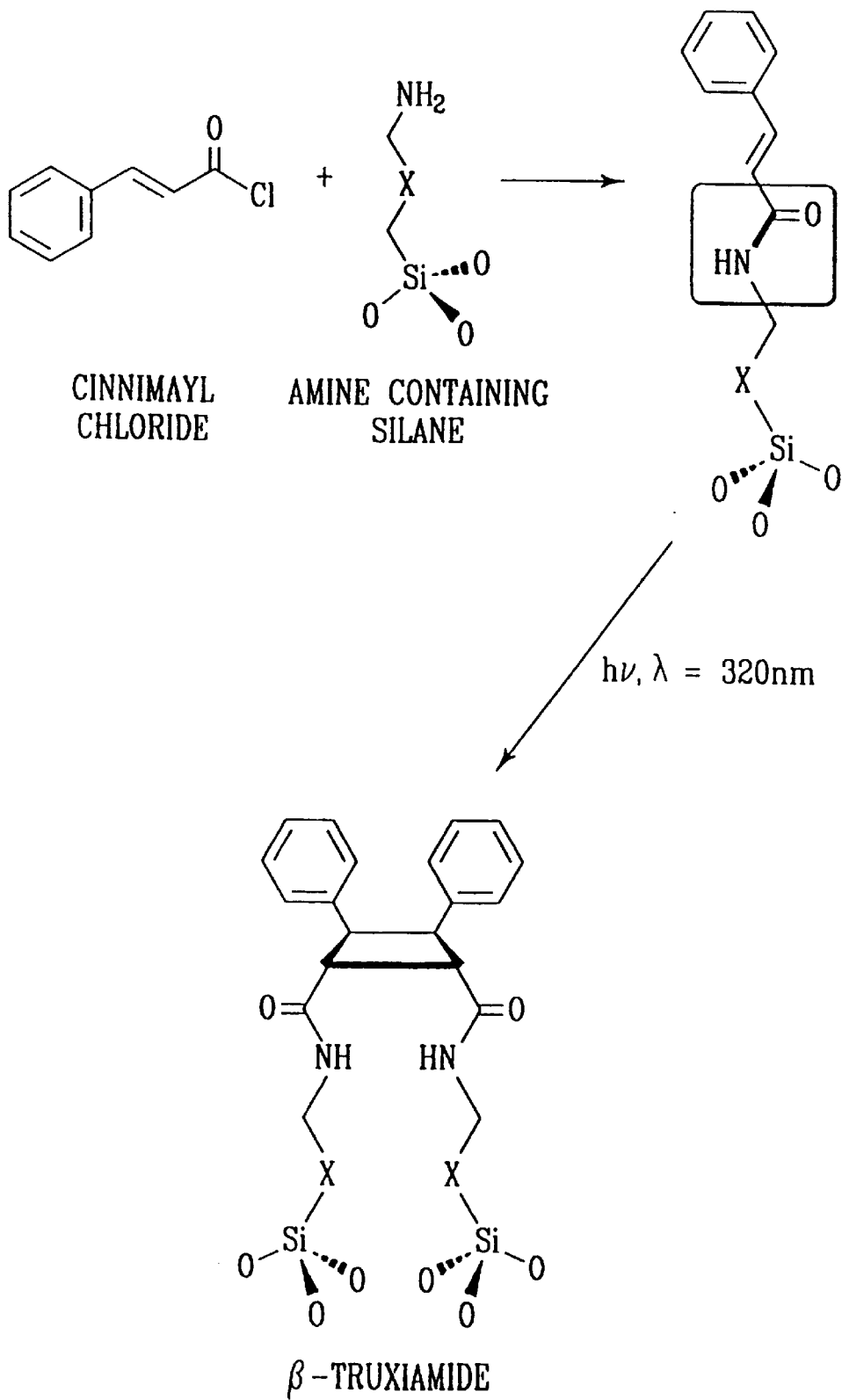
FIG. 5 is a schematic representation of one embodiment of the different steps involved in the invention alignment process, Step 2: optional modification of the chemisorbed silane (DETA, EDA, APS or ABTE) layer and attachment of the photopolymerizable group (cinnamoyl chloride); Step 3: Irradiation by polarized UV light and formation of oligomer pairs (including β truxiamides)

In addition to the cinnamoyl groups described in FIG. 5, any other suitable directionally linkable groups may be used including those depicted in FIG. 13 and any other group capable of directional linking to a neighboring P group by means of polarized radiation, heat, surface manipulation with a scanning tunneling microscope, atomic force microscope, etc. These groups can directionally link in any fashion—meaning that anisotropic dimer formation, oligomer formation, polymer formation, charge transfer complexation, ionic attraction, etc. all produce useful surfaces providing LC alignment. In addition, the P–P' directional link may be chiral. Directional linking of P groups is preferably effected by linearly, circularly or elliptically polarized UV light, or a combination thereof including a combination of polarized and unpolarized UV light. In addition, radiation in the VIS or IR range may be used. A preferred embodiment of the present invention is a surface coated with a chemisorbed layer of $[X]_m-[S]_n-[P]_o$ molecules which have been polymerized with polarized UV radiation to form mostly dimers. Preferred sorbable molecules according to the invention have m=n=o=1.

However, since a layer-forming molecule of the present invention can bear more than one P group, o may be an integer greater than 1. While each spacer preferably has one P group, more than one P group may be present on each spacer. Thus o is preferably greater than or equal to n and is preferably an integer of from 1–4.

When one layer-forming molecule of formula 1 has two or more P groups, the P groups on a single molecule may be directionally linked to one another, or some or all of the several P groups on one molecule may be directionally linked to P groups on other molecules. With two or more P groups on a single molecule, a combination of these effects can be used. For example, two P groups on one molecule can directionally link, followed by further directional linking with a P group on a neighboring molecule. By "neighboring" any molecule with a P group that reacts with the subject P group is meant.

The invention $[X]_m-[S]_n-[P]_o$ compounds are prepared by simple organic reactions well known to and within the skill of the ordinary artisan and explained in, e.g., *Introduction to Organic Chemistry*, A. Streitwieser and C. Heathcock, Macmillan, 1976; *Reagents for Organic Synthesis*, Fieser and Fieser, John Wiley and Sons, 1967 and succeeding volumes; *Survey of Organic Syntheses*, John Wiley and Sons, Vols I and II, 1970; and *Advanced Organic Chemistry*, March, Wiley, 1985, all incorporated herein by reference.

The invention anisotropic surfaces may be made as thin as one layer of molecules of formula 1 or several multiples thereof. Any thickness is acceptable. A preferable thickness is 3 to 3000 angstroms. The invention surfaces can be prepared by processes including the electric poling, magnetic field, solvent flow, etc., alignment of $[X]_m-[S]_n-[P]_o$ molecules followed by directional linking with heat, light, chemical activation, etc., and are not limited to those produced by the process described below. Those surfaces produced by the below-described process are preferred.

The preferred process of the present invention comprises two or three steps: (i) formation of a sorbed, preferably chemisorbed, layer or layers of $[X]_m-[S]_n-[P]_o$ molecules on a substrate (or $[X]_m-[S]_m$ or $[X]_n$ molecules if desired), (ii) optional chemical modification of the sorbed molecules to provide at least one spacer group S and at least one directionally linkable group P therein if none is present prior to sorption and (iii) directional linking using any of the methods described above, preferably using polarized radiation, particularly polarized UV radiation. Step (ii) can be omitted if the material used in step (i) already comprises a spacer and directionally linkable group.

The three possible steps involved in the invention process are shown schematically in FIGS. 1 and 5. First a sorbed (preferably chemisorbed) layer or layers of molecules bearing no P group is placed on the surface of a substrate as a foundation, which is then rendered photosensitive by attachment of a P group (in this case, a UV chromophore). Finally, an anisotropic surface is created by photopolymerization with polarized UV light wherein the polymerizable groups of neighboring (presumably adjacent) molecules are bonded together, the direction of the polymerization being dictated by the polarization direction of the radiation. UV radiation, IR radiation, visible radiation etc., are included. The final result is a surface containing anisotropic molecular and, it is thought, geometric features whose direction dictates the direction of orientation for the long axis, or average director, of the liquid crystal molecules. Preferred methods of carrying out the invention steps are described below.

(i) Substrate preparation: The first stage of the invention sorption, preferably chemisorption, process preferably includes preparation of the substrate surface. This procedure applies to glass, ITO-coated glass, silicon wafers, etc. and is simply the cleaning of the substrate surface. In one preferred embodiment the substrate is sonicated twice in chloroform. Then the substrate is washed in 1:1 HCl/methanol for 30 minutes (a step that is omitted for ITO-coated glass), followed by 3× rinsing with distilled water. It is then washed in concentrated $H_2SO_4$ for 30 minutes and again rinsed three times with distilled water. The substrate is heated in distilled water to 80–100° C. for about 5 minutes then cooled. Another method to prepare the substrates for chemisorption is the use of an oxygen plasma for 5 minutes. After such treatment the substrate is ready for chemisorption, adsorption, absorption, etc. of compounds of general formula $[X]_m-[S]_n-[P]_o$ or $[X]_m-[S]_n$ or $[X]_m$ if no polymerizable group or spacer is present.

(ii) Attachment of the sorbed layer—A solution for adsorption, absorption, chemisorption, etc. may be prepared or other art known methods of sorption may be used. A typical preferred chemisorption solution contains 1% by volume of the desired chemisorbable material, 5% by volume distilled water and 94% by volume of a 1 mM acetic acid solution in methanol. The substrate to be treated is dipped in this solution and allowed to stand for 5–15 minutes at room temperature. The solution is then poured out, and the substrate rinsed 3× with fresh methanol. The substrate may then be baked at 120° C. for 15 minutes to dry. The chemisorbable molecules become chemically bonded to the surface: i.e., the molecules are covalently bonded thereto. The chemisorbed layer is then ready for chromophore attachment, if no chromophore is present in the material in the first place. The layer can be sorbed in a particular pattern.

Figure 6A:
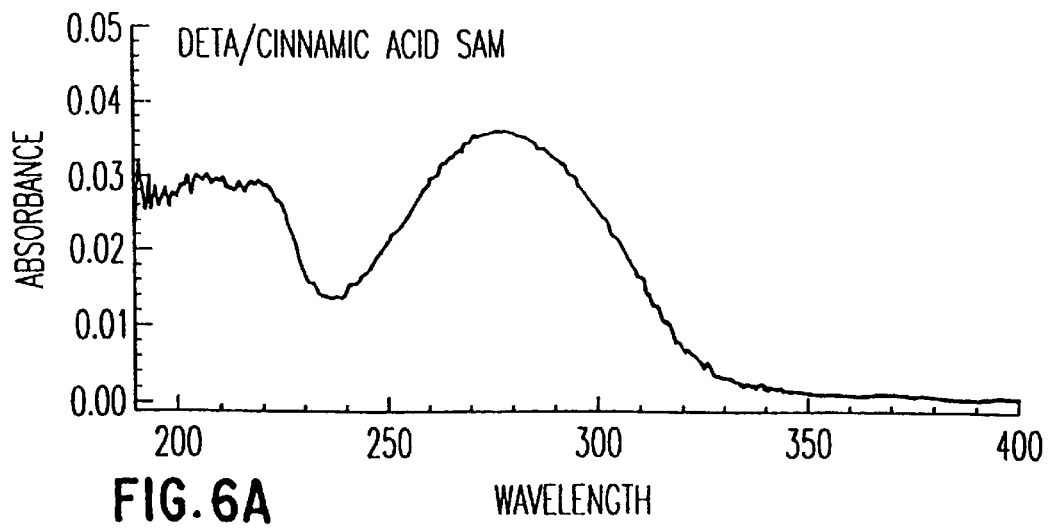
FIG. 6 is the UV absorption spectra of the chemisorbed silane layer after attachment of the cinnamoyl chloride unit. (a) DETA, (b) EDA and (c) ABTE.
Figure 6B:
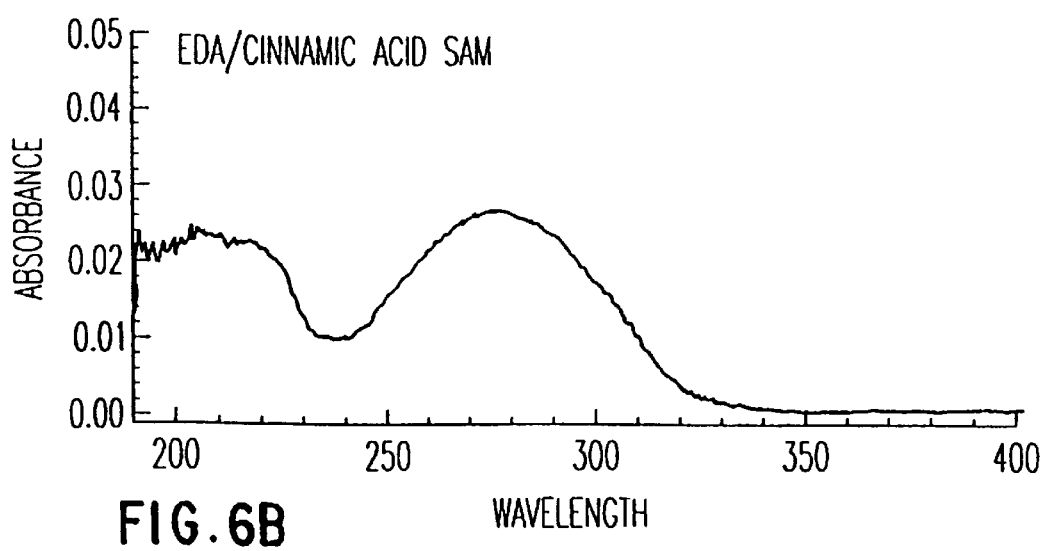
Figure 6C:
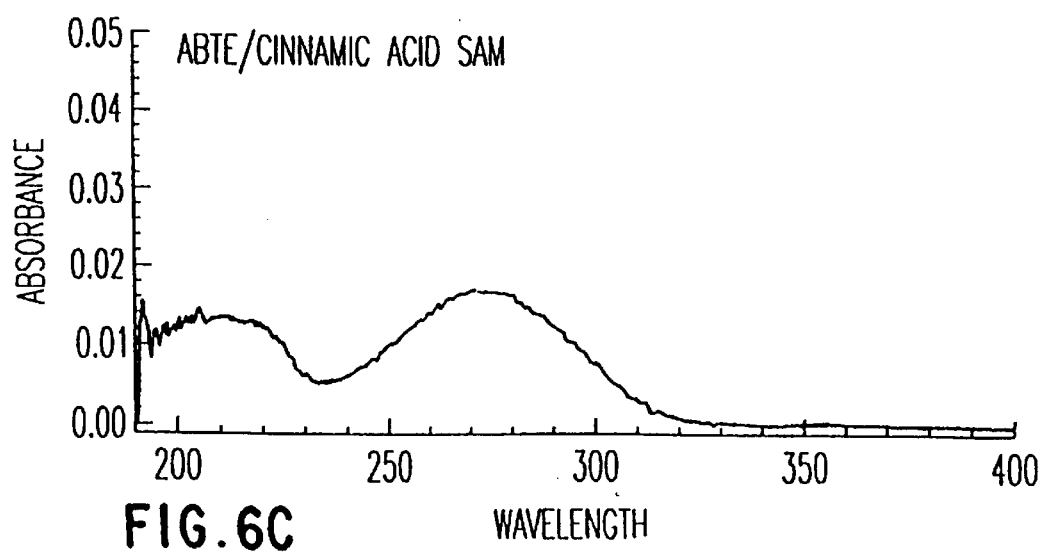

(iii) Attachment of the spacer and directionally linkable group to the initially sorbed layer:

In this step (optional since the molecule absorbed, adsorbed, chemisorbed to the surface in (ii) above may already possess a spacer and a polymerizable group) a directionally linkable group and, if desired, a spacer other than a single bond is attached to the sorbed layer. The substrate with the sorbed layer is immersed in a solution containing a compound with, e.g., a spacer bonded to a directionally linkable group and a chemically reactive group for reaction with the initially sorbed layer, like cinnamoyl chloride. Acetonitrile can be used as the solvent. The substrate is then allowed to stand in the solution for one hour in the dark. This ensures attachment of the spacer and, e.g., polymerizable chromophore to the sorbed layer. In four specific embodiments using APS, ABTE, EDA and DETA, cinnamoyl chloride chemical modification was ascertained by the UV absorption peak seen at 275 nm (see, e.g., FIG. 6). The directionally linkable group, etc., can be provided in a pattern if so desired.

Figure 7:
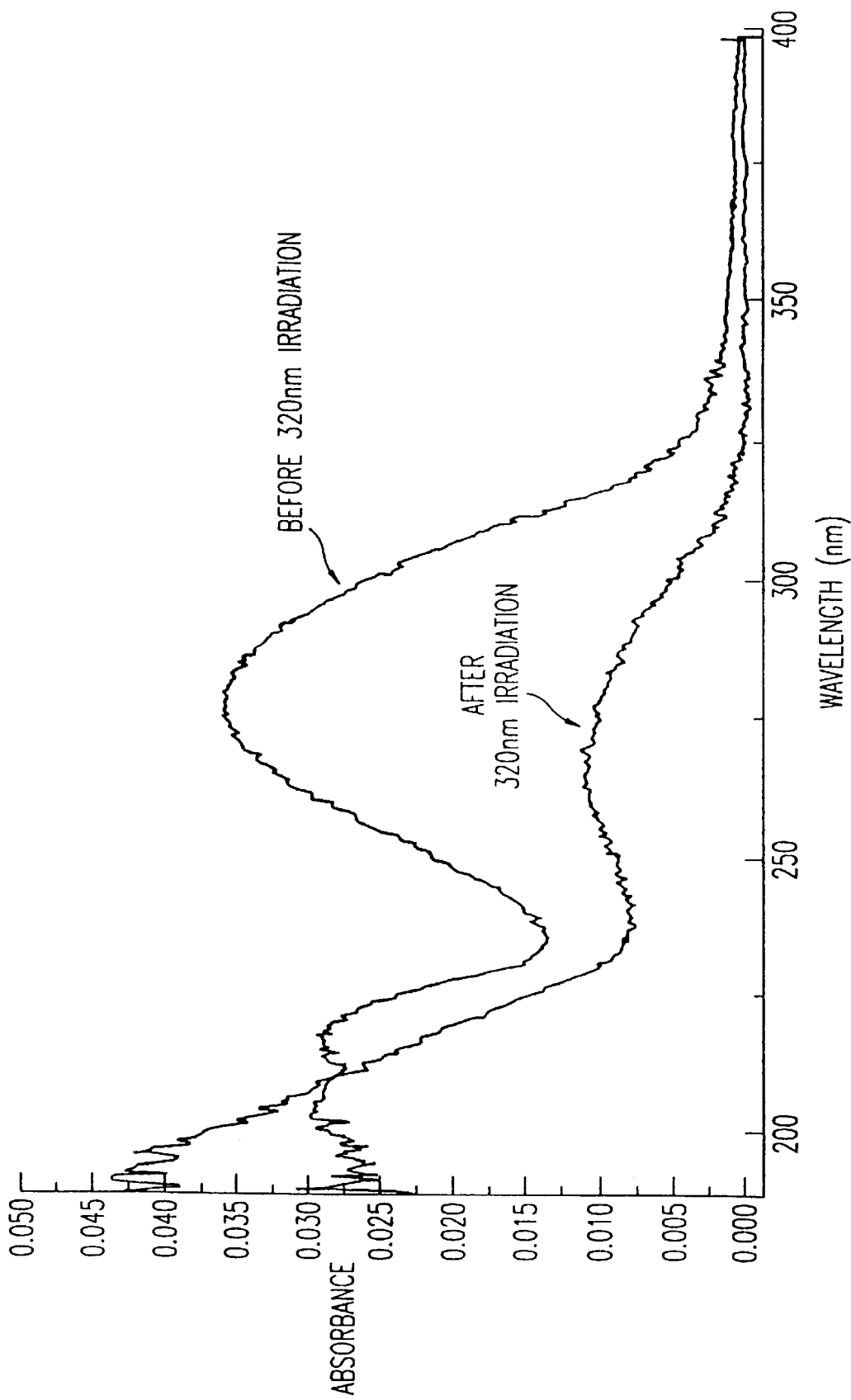
FIG. 7 is the UV absorption spectra of the chemisorbed silane layer before and after photopolymerization.

(iv) Directional linking:

The last step of the invention process is directional linking, preferably directional dimerization, oligomerization, polymerization, etc. Directional oligomerization, dimerization and polymerization are preferred. In one preferred embodiment a substrate with a photopolymerizable chemisorbed layer is irradiated with polarized UV radiation to obtain an anisotropic surface. A typical dosage of UV radiation is about 3 $J/cm^2$ for about 15 minutes. As the skilled artisan knows, the time varies with lamp intensity, closeness of the substrate to the lamp, etc. The dosage also may suitable vary. This treatment leads to a photo-induced reaction between photopolymerizable or photodimerizable groups of, presumably, adjacent chemisorbed molecules, forming thereby a cyclobutane ring (in the case of cinnamic acid polymerizable derivatives). See FIG. 5. The existence of these s-truxiamide pairs was ascertained by UV absorption spectra: photopolymerization resulting in the dimer pair formation results in a drastic reduction in the peak at 275 nm and an increase in UV absorbance at 193 nm due to the presence of cyclobutane rings (FIG. 7). Patterning can occur b linking using a pattern of light passed through a mask, etc.

While not being bound by a particular theory, formation of the directionally linked surface is believed to result in a highly anisotropic surface. The polymerization structure, or perhaps more correctly in the case of cinnamic acid derivatives, the directionally dimerized structure, is believed to be oriented in a single preferred direction, dictated by the direction of the polarization of the light used to effect directional linking. The invention process thus creates a permanent, bound anisotropic surface layer on a substrate by a process which does not involve any rubbing or any guest-host interaction. The invention surface is stable to, e.g., heat and light and solvents (methanol, acetonitrile, water, etc.), maintaining orientation of liquid crystalline molecules in contact therewith even after exposure to high temperature or UV radiation for extended periods. Depending on the compound of formula 1 used, the invention surface can be colorless or colored, showing absorption in the visible range of from 0% to 100%.

In another embodiment, the present invention provides a preferred group of compounds in which the group P has the formula (1):

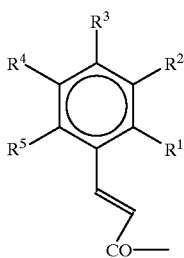

(I)

wherein each of $R^1$, $R^2$, $R^3$, $R^4$, and $R^5$ is independently H, linear or branched $C_nH_{2n+1}$, linear or branched $OC_nH_{2n+1}$, or $NO_2$, where n is an integer of 1 to 8, and where at least one of $R^1$, $R^2$, $R^3$, $R^4$, and $R^5$ is not H;

The present invention also provides a preferred group of compounds in which the group P has the formula (IA):

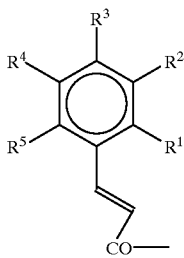

(IA)

wherein each of $R^1$, $R^2$, $R^3$, $R^4$, and $R^5$ is H, Br, Cl, F, $CF_3$, CN, NC, linear or branched and racemic or chiral —$CO_2C_nH_{2n+1}$, linear or branched and racemic or chiral $C_nH_{2n+1}$, linear or branched and racemic or chiral $OC_nH_{2n+1}$, $OCH_2C_nF_{2n+1}$, $NO_2$ or OH, where n of such RI-$R^5$ groups is an integer of 1 to 12.

The compounds in which P has formula (I) or (IA) as specified above can be prepared by reaction of a compound of formula (II):

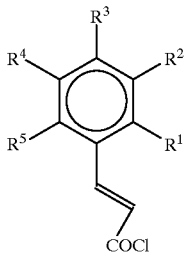

(II)

wherein in the case of preparation of a compound of formula (I), each of $R^1$, $R^2$, $R^3$, $R^4$, and $R^5$ is independently H, $C_nH_{2n+2}$, $OC_nH_{2n+1}$, or $NO_2$, wherein n is an integer of 1 to 8, provided that not all of $R^1$, $R^2$, $R^3$, $R^4$, and $R^5$ are H;

or wherein in the case of preparation of a compound of formula (IA), each of $R^1$, $R^2$, $R^3$, $R^4$, and $R^5$ is H, Br, Cl, F, $CF_3$, CN, NC, linear or branched and racemic or chiral —$CO_2C_nH_{2n+1}$, linear or branched and racemic or chiral $C_nH_{2n+1}$, linear or branched and racemic or chiral $OC_nH_{2n+1}$, $OCH_2C_nF_{2n+1}$, $NO_2$ or OH, where n is an integer of 1 to 12;

with a compound of formula $[X]_m-[S]_n$ as those groups are defined above.

The compounds of formula (II) can be prepared by standard organic reactions well known to those skilled in the art. Preferred groups for $R^1$, $R^2$, $R^3$, $R^4$, and $R^5$ include nitro, fluoro, trifluoromethyl, methoxy, or (R) or (S) sec-alkyl such as (R) or (S) sec-butyl (chiral) or (R) or (S) sec-octyl (chiral), or n-alkyl such as n-octyl, n-hexyl or n-butyl. It may be preferable that only one of $R^1$, $R^2$, $R^3$, $R^4$, and $R^5$ is not H. The $R^1$, $R^2$, $R^3$, $R^4$, and $R^5$ groups may suitably be chiral or racemic in the case of groups with asymmetric atoms.

Other features of the invention will become apparent in the course of the following descriptions of exemplary embodiments which are given for illustration of the invention and are not intended to be limiting thereof.

EXAMPLES

Example 1

Trichlorosilanes depicted in FIG. 2 containing different lengths of saturated hydrocarbon chains were covalently attached to glass surfaces by dipping the glass in a solution containing the silanes. The solution was 5% water, 94% 1 mM solution of acetic acid in MeOH and 1% (vol/vol/vol) of silane. The resulting layers were hydrophobic, with water contact angles in the range of 75–90°.

The alignment of a commercially available room temperature nematic liquid crystal (E-63 from Merck) containing a mixture of alkyl cyanobiphenyls and having the following LC transition temperatures K-8° C.-N-84° C.-I in contact with the chemisorbed layers of these hydrophobic silanes was investigated, and the orientation obtained was homeotropic (i.e., perpendicular to the substrate surface). Liquid crystal mixture E7 from Merck containing —$C_5$, —$C_7$ and —$OC_8$ substituted cyanobiphenyls and —$C_5$ substituted cyanotriphenyl can also be used, as can any material, composition, etc. exhibiting anisotropy, preferably liquid crystallinity.

Example 2

Experiment 1 was repeated with the exception that the silanes studied were 4-aminobutyltriethoxy silane (or ABTE), N-(2-aminoethyl)-3-aminopropyl trimethoxy silane (or EDA) trimethoxysilylpropyldiethylenetriamine (or DETA) and 3-aminopropyl trimethoxy silane (or APS). See FIG. 3. All four silanes have a polar —$NH_2$ group at the free end of the molecule. This group modified the hydrophilicity of the substrate surface after attachment of the molecule. EDA and DETA contain, in addition to the terminal amine group at the end, one or two additional amine groups as bridging groups linking the hydrocarbon chains. This permits the variation of the degree of hydrophilicity and/or the strength of the dipolar interactions.

The four amine silanes were chemisorbed on ITO-coated glass surfaces, and a common sandwich cell was made using liquid crystal mixture E-63 from Merck. Both glass surfaces of the cell in contact with the LC had aligning chemisorbed layers. The cells were examined on a rotating stage of a microscope with a light source. The LC cell was placed between crossed polarizers within the microscope.

Figure 4A:
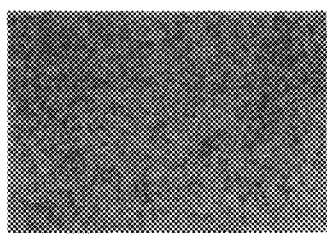
FIG. 4 shows the optical textures obtained with E-63 on an ITO substrate treated with different hydrophilic silanes.
Figure 4B:
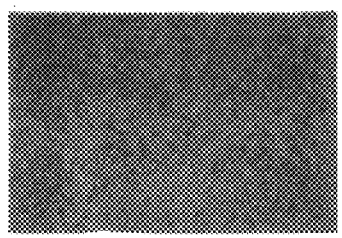
Figure 4C:
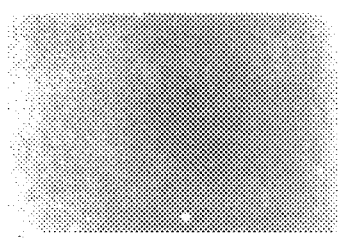

FIG. 4 shows photographs of the textures exhibited by E-63 under crossed polarizers. In the top row of photographs the average director of the LC is at an angle of 45° to the polarizer or analyzer while in the bottom row of photographs, the director is parallel to either of them. Acceptable planar alignment was seen for all chemisorbed layers.

Example 3

APS, ABTE, EDA and DETA layers were chemisorbed on plane glass according to the process described above and cinnamoyl groups were provided thereon as polymerizable group P according to (iii) above. The layers were directionally polymerized as described above with UV light. In order to compare the alignment obtained in the directionally polymerized (DP) treated region with that in a non-polymerized region, a mask was used to directionally polymerize only part of the chemisorbed layer. A 10 μm thick cell was prepared with E-63 sandwiched between two directionally linked surface-treated substrates. All observations were made between crossed polarizers and the cell was mounted on the rotating stage of a polarizing microscope.

Figure 8B:
FIG. 8 shows the liquid crystal alignment obtained with a plain glass cell having a directionally polymerized surface thereon. Both directionally polymerized and unpolymerized regions are shown. The LC molecules are aligned (dark region) in a uniform planar orientation in the polymerized regions.
Figure 8A:

The LC molecules were found to be aligned extremely well in a uniform planar configuration in the invention surface region while there was hardly any alignment in the unpolymerized regions, the line of demarcation being very sharp. FIG. 8 shows photographs for two positions of the sample, i.e., when the LC director is at 45° or parallel to the axis of the polarizer/analyzer. The DP region is uniformly dark in the latter case while it is uniformly bright in the former case. The quality of the alignment was so good that even under high magnification few defects were seen in the invention surface region.

The particular set-up used was either a Nikon Optiphot Polarizing Microscope with a 100 W white light source and 12 V DC power supply, a Nikon photodiode, a Melles Griot amplifier (for the optical signal) and a Keithley digital multimeter (199 system DMM) receiver or an Olympus BH-2 Polarizing Microscope with a 100 W white light source, 12 V DC power supply, UDT photodiode, and UDT Optometer model 5370 with built-in amplifier. Both set-ups used a Wavetek model 395 synthesized arbitrary waveform generator and Trek model 50/750 amplifier to apply the electric field to the samples. In all cases, excellent contrast ratios were obtained with the invention surface.

Example 4

Figure 9B:
FIG. 9 shows the liquid crystal alignment in a twisted nematic (TN) cell comprising directionally linked surfaces coated on substrates. The base substrates consist of bare ITO glass. Both directionally linked and non-linked coated regions are shown. The liquid crystalline (LC) molecules are aligned in a uniform planar orientation in the directionally linked regions.
Figure 9A:

Alignment surfaces were prepared in accordance with Example 1 on bare ITO coated glass surfaces. A cell was made with E-63 in a twisted nematic configuration so that the LC was in direct contact on both sides with DP treated substrates mounted such that the direction of polymerization for the two substrates was orthogonal to each other. This resulted in a twisted nematic (TN) cell with good alignment, as seen in FIG. 9. The Figure shows the cell between parallel and between crossed polarizers. Once again, the invention treated region gave a uniform planar alignment while the untreated region showed no alignment. It was noted, however, that the quality of alignment on ITO was, in general, not as perfect as it was on plain glass. This is believed to be due to inherent surface inhomogeneities on the ITO surface.

Example 5

ITO coated glass overcoated with a $SiO_2$ layer was studied in the same fashion as in Example 1. These substrates are typical of those used by the display industry. ITO glass (225 ohms/square surface resistance) coated with 690 Å of $SiO_2$ (purchased from Donnely Corporation) was used.

Figure 10B:
FIG. 10 shows the liquid crystal alignment in a twisted nematic cell comprising directionally linked surfaces coated on substrates. Base ITO-coated glass substrates are first coated with a passivation layer of $SiO_2$ which is 690 Å thick. Both directionally linked and nonlinked regions are shown.
Figure 10A:

The passivated ITO was subjected to treatment under exactly the same conditions as in Example 3 using APS with a cinnamoyl group. A sample cell with the directionally linked treated passivated ITO surfaces was prepared in a TN configuration. Excellent alignment was obtained in the invention surface regions (FIG. 10). In fact, the aligned regions were defect-free even when observed with increased magnifying power. The contrast ratio was very high and comparable to that of commercial TN cells of the same thickness. While contrast ratios vary with the equipment used to measure them, we obtained ratios >9 and as high as about 33.

Example 6

X—S—P molecules (n=m=o=1) are chemisorbed on aluminum oxide as in Example 1. P here is acrylate, S is $C_{10}$ alkyl, and X is carboxyl. Directional polymerization as in Example 3 is effected.

Example 7

X—S—P molecules (n=m=o=1) are chemisorbed on a gold surface by dissolving the molecules in solvent and applying the solution to the gold surface for 24 hours. X here is a thiol group, S is a parasubstituted bicyclohexyl group and P is a styrenyl group. Directional polymerization as in Example 3 is effected.

In this manner, we have shown that directional linking results in surfaces which provide uniform planar alignment on substrate surfaces including glass, ITO and passivated ITO surfaces. Electrooptic studies on two TN cells made from ITO and passivated ITO surfaces with directionally linked alignment layers will now be described.

Example 8

Two 10 micron thick TN cells with invention aligning surfaces on bare ITO in one case and passivated ITO in another case were prepared. The chemisorbed material used was ABTE (bare ITO) or APS (passivated ITO) both with cinnamoyl P groups. The electrooptic characteristics of the two cells are shown in FIGS. 12 and 13, respectively. In both cases the invention surface treatment provides sufficient anchoring for the functioning of a TN device. The on-time for both cells is very fast (<0.5ms) and comparable to commercial TN cells. The off-times were 16 ms for bare ITO (FIG. 11) and 55 ms for passivated ITO (FIG. 12).

Example 9

Synthesis of the chromophores

FIGS. 14 describes two reaction pathways which lead to 4-alkoxy-cinnamic acid. 4-Hydroxy-cinnamic acid (1) is reacted with an alkylbromide and an excess of potassium hydroxide to yield the corresponding racemic 4-alkoxy-cinnamic acid (4a). This procedure is applicable for racemic alkylbromides. If a fluorinated alkoxy substitution is desired fluorinated alkylbromides are being used.

To obtain chiral 4-alkoxy cinnamic acids the 4-hydroxy-cinnamic acid (1) FIG. 14 is heated under reflux in methanol with catalytic amounts of acid to give 4-hydroxy-methyl cinnamate (2) with 96% yield. The etherification of (2) with a chiral alcohol or chiral fluorinated alcohol via the Mitsunobu reaction in the presence of triphenylphosphine (TPP) and diethylazodicarboxylate (DEAD) gave 4-alkoxy-methyl cinnamate (3) with 90% yield. The Mitsunobu reaction proceeds with an inversion of the configuration at the chiral center. The deprotection of the acid function of (3) led to 4-alkoxy-cinnamic acids (4a).

The acid chloride form of the chromophores (5) needed during the chemisorption process is obtained by reaction of the substituted cinnamic acids (4) with an excess of thionyl chloride in benzene. The reaction mixture is refluxed overnight to give (5) with 90% yield. A number of chromophores synthesized after the above given procedure is shown in FIG. 15.

Synthesis. 4-Hydroxy-methyl cinnamate (2): 0.09 mmol of the 4-hydroxy-cinnamic acid (1) was added to 200 mL of anhydrous methanol along with 2 mL of methanesulfonic acid.

The reaction mixture was refluxed for 16 hours. The methanol was removed under vacuum at the rotavapor. The ester (2) was recrystallized from a mixture of absolute ethanol/hexane (70:1) and obtained in 50% yield. 4-Alkoxy-methyl cinnamate (3): 16.8 mmol of (2), 16.8 mmol alkanol (chiral or racemic) and 17.16 g of triphenyl phosphine (TPP) was solved in 85 mL anhydrous THF under a nitrogen atmosphere. Diethyl-azodicarboxylate (DEAD) in 10mL anhydrous THF was added dropwise and the resulting reaction mixture was stirred overnight at room temperature. 1 mL (DEAD) was added to quench the excess TPP. The solvent was evaporated and the residue was extracted with 4:1 hexane/ethylacetate. The solvent was removed under vacuum and the resulting crude product was purified by column chromatography using hexane/ethylacetate 4:1. The product (3) was obtained in a 75% yield.

4-Alkoxy-cinnamic acid (4): Method 1:11.4 mmol of (3) was solved in a mixture of 150 mL methanol and 40 mL water. 50.8 mmol lithiumhydroxide-monohydrate was added and the mixture stirred overnight at room temperature. The solvent was stripped and the residue acidified with 1:1 HCl/water. The product was collected by vacuum filtration and recrystalized from acidic ethanol to (4a) in 70% yield.

Method 2: For commercially available racemic alkylbromides it is possible to go in one step from the 4-hydroxy-cinnamic acid (1) to the 4-alkoxy-cinnamic acid (4a). 1 mmol of (1) were solved in a mixture of ethanol/water (75/25%) 3 mmol KOH and catalytic amounts of KI were added and the mixture was refluxed for 1 hour. Then 1 mmol of the alkylbromide was added and the mixture was refluxed for 1 hour. Then 1 mmol of the alkylbromide was added and the reaction mixture refluxed for 24 hours. The solvent was removed at the toravapor and the precipitate acidified with HCl. The product was recrystallized from a mixture of ethanol/water (75/25%). The yield of the reaction is 70%.

Synthesis of the cinnamoyl chlorides (5): 1 mmol of the cinnamic acid (4) was solved in anhydrous benzene and stirred in an aluminum foil covered flask. 3 mmol thionyl chloride was added and refluxed under stirring overnight. The solvent was removed under vacuum and the product (5) recrystallized from hexane. The derivatives of cinnamoyl chloride were obtained in a 90% yield.

Example 10

Additional synthesis of nitro-and -methoxy substituted cinnamoyl chlorides

The reaction pathway is given in FIG. 14. 25.8 mmol of the nitro or methoxy substituted cinnamic acid were dissolved in 100 mL of anhydrous THF and stirred at room temperature under a nitrogen atmosphere in an aluminum foil covered flask. Oxalylchloride (51.6 mmol) was added dropwise within 30 min. The resulting reaction mixture was stirred overnight. The solvent was removed under vacuum. To remove the excess of oxalylchloride, anhydrous hexane was added (three times 100 mL) and the solvent evaporated on a rotary evaporator. The derivatives of cinnamoyl chloride were obtained in a 95% yield.

Example 11

Additional synthesis of alkoxy-cinnamoyl chlorides (given for a substitution in the 4 position)

The reaction pathway is given in FIG. 15.

4-Hydroxy-methyl cinnamate (2): 0.09 mmol of the 4-hydroxy-cinnamic acid (1) was added to 200 mL of anhydrous methanol along with 2 mL of methanesulfonic acid. The reaction mixture was refluxed for 16h. The methanol was removed under vacuum at a rotary evaporator. The ester (2) was recrystallized from a mixture of absolute ethanol/hexane (70: 1) and obtained in 50% yield.

4-Alkoxy-methyl cinnamate (3): 16.8 mmol of (2), 16.8 mmol alkanol (chiral or racemic) and 17.16g of triphenyl phosphine (TPP) were dissolved in 85 mL of anhydrous THF under a nitrogen atmosphere. Diethyl-azodicarboxylate (DEAD) in 10 mL of anhydrous THF was added dropwise, and the resulting reaction mixture was stirred overnight at room temperature. 1 mL of DEAD was added to quench the excess TPP. The solvent was evaporated, and the residue was extracted with 4:1 hexane/ethylacetate. The solvent was removed under vacuum, and the resulting crude product was purified by column chromatography using hexane/ethylacetate 4:1. The product (3) was obtained in a 75% yield.

4-Alkoxy-cinnamic acid (4): 11.4 mmol of (3) was dissolved in a mixture of 150 mL of methanol and 40 mL of water. 50.8 mmol of lithium hydroxide-monohydrate was added, and the mixture was stirred over night at room temperature. The solvent was stripped, and the residue was acidified with 1:1 HCl/water. The product was collected by vacuum filtration and recrystallized from acidic ethanol to give (4) in 70% yield.

4-Alkoxy-cinnamoyl chloride (5): 6.2 mmol of (4) was dissolved under 5 nitrogen and stirring in 30 mL of anhydrous THF in an aluminum foil covered flask. 18.6 mmol of oxalyl chloride was added, and the mixture was stirred overnight. The solvent was removed under vacuum. To remove the excess of oxalylchloride, anhydrous hexane was added (three times 100 mL), and the solvent evaporated at a rotary evaporator. The derivatives of cinnamoyl chloride were obtained in a 95% yield.

Example 12

Synthesis of molecules containing a directionally linkable moiety. As shown in FIG. 16 a substituted cinnamovl chloride can be connected to the silane moiety before the chemisorption process.

To a mixture of 1 mmol of 3-amino-propyl trimethoxy-silane (6) and 1 mmol triethylamine in THF at 0C was added dropwise a solution of 1 mmol of the substituted cinnamoyl chloride (5) in THF. The reaction mixture was stirred and left to warm to room temperature. After 3 hours the mixture was filtrated and the solvent was evaporated and methvlene chloride was added.

The solution was washed with chilled water and dried over $MgSO_4$. The solvent was evaporated and the mixture filtered over a short column with ethylacetate/hexane (2/3) as a eluent after evaporation of the solvent the product (6a) was dried dried under vacuum. The yield was 80%.

Example 13

Chemisorption and modification of the chemisorbed layer

The reaction solution was prepared as follows: 94% (by volume) of a 1 mM solution of acetic acid in methanol (HPLC grade) were combined with 1% aminosilane 6 or trimethoxysilane 6a and 5% of distilled water # 18 ωW) (vol/vol/vol). The freshly cleaned substrates (wet cleaning or plasma etching) were treated for 15 minutes with the amino silane solution at room temperature. The substrates were rinsed once with methanol (HPLC grade), dried and baked for 5 min at 110° C.

Formation of the amide

After cooling, the aminosilane substrates were rinsed twice with acetonitrile and then treated with a solution of a substituted cinnamoyl chloride such as prepared in Examples 9 and 10 (60 mM) and of diisopropylethylamine (30 mM) in anhydrous acetonitrile under the exclusion of light. (This step is not necessary if the trimethoxysilane 6a is used for chemisorption).

17

Example 14

In order to demonstrate the applicability of the present alignment process to liquid crystal display devices, fabricated both planar and twisted nematic cells were fabricated. The electro-optic characteristics were recorded to show that the alignment process is applicable to these devices. Although the examples discussed below refer to planar and TN cells only, the process is certainly applicable to, but not restricted to, monochrome as well as color TN displays used in both passive and active addressed modes, thin film transistor (TFT) active matrix displays, film compensated super-twisted nematic (STN) displays, subtractive color STN displays, smectic-A laser-addressed devices, ferroelectric LCDS, electroclinic LCDS, light valve and projection mode devices. Some specific device examples are discussed below.

Preparation of planar cells. 20 $\mu$m thick planar cells with substituted DPS treated bare ITO substrates were fabricated. Before the cell was assembled epoxy glue was applied parallel to the edges on one substrate. The second substrate was placed on the first with the DPS treated surfaces facing each other and with the preferred alignment direction of the top substrate parallel to that of the bottom substrate. An approximate cell thickness of 20 $\mu$m was obtained with glass spheres. The glue was cured at 65° C. for 4 hours under a vacuum. The cell was capillary filled with the liquid crystal mixture E7 in the isotropic phase. These cells were used for pretilt measurements.

Preparation of twisted nematic (TN) cells. 5mm thick TN cells with substituted DPS treated bare ITO substrates were fabricated. Epoxy glue was applied parallel to the edges on one substrate. The second substrate was placed on the first with the DPS treated surfaces facing each other and with the preferred alignment direction of the top substrate at 90° with respect to that of the bottom substrate. The substrates were off-set by approximately 5 mm to allow for subsequent electrical contacts. An approximate cell thickness of 20 $\mu$m was obtained with glass spheres. The glue was cured at 65° C. for 4 hours under a vacuum. The cell was capillary filled with the liquid crystal mixture E7 in the isotropic phase. These cells were used for electro-optical studies.

Example 14a

Parallel liquid crystal cell of the 4-nitro-substituted DPS

The cell showed good alignment between crossed polarizers under a microscope. The contrast ratio was found to be 30.

Example 14b

Parallel liquid crystal cell of the 3-nitro-substituted DPS

The cell showed good alignment between crossed polarizers under a microscope. The contrast ratio was found to be 30.

Example 14c

Parallel liquid crystal cell of the 4-methoxy-substituted DPS

The cell showed good alignment between crossed polarizers under a microscope. The contrast ratio was found to be 30.

Example 14d

Parallel liquid crystal cell of the 4-butoxy-substituted DPS

The cell showed good alignment between crossed polarizers under a microscope. The contrast ratio was found to be 30.

Example 15

Determination of the pretilt by the crystal rotation method
Crystal Rotation Method The crystal rotation method is used to determine the pre-tilt angle in planar cells. It is assumed that the pre-tilt angle that the optic axis makes with the surface is small (0–10 degrees).

The method relies on the determination of the optical phase retardation and transmitted intensity as a function of the angle of incidence of the laser beam with respect to the normal cell walls. The cell itself is rotated around an axis perpendicular to the optical axis.

The transmitted intensity oscillates the angle of incidence is charged.

The intensity curve is symmetric about a certain angle called the symmetry point, which is related to the pre-tilt angle. Thus, if the ordinary and extraordinary refractive indices and the cell thickness are known, the pre-tile angle can be calculated. The accuracy of the method is the order of 0.3 degrees.

A scheme of the experimental setup is given in FIG. 16.

Example 15a

Pretilt on the cell with the 4-nitro-substituted DPS
The pretilt was measured to be 2° (FIG. 18).

Example 15b

Pretilt on the cell with the 3-nitro-substituted DPS
The pretilt was measured to be 1.5° (FIG. 19).

Example 15c

Pretilt on the cell with the 4-methoxy-substituted DPS
The pretilt was measured to be 0.1° (FIG. 20).

Example 15d

Pretilt on the cell with the 3-butoxy-substituted DPS
The pretilt was measured to be 0.25° (FIG. 21).

Example 15e

Pretilt on the cell with 100% 4-nitro-substituted chromophore.
The pretilt was measured to be 160 (FIG. 22).

Example 15f

Pretilt on the cell with 50% 4-nitro-substituted chromophore and 50% unsubstituted chromophore (FIG. 23).
The pretilt was measured to be 200.

Example 15g

Dependence of pretilt on the polarity of the chromophore for liquid crystal mixture E7.
Results are set forth in Table 1 of FIG. 24.

Example 15h

Dependence of pretilt on the polarity of the chromophore for liquid crystal mixture ZLI 4792.
Results are set forth in Table 2 of FIG. 25.

Example 15i

Dependence of pretilt on the polarity of the chromophore for liquid crystal mixture ZLI 4792 and E7.
Results are set forth in Table 3 of FIG. 26 and in FIG. 27.

Example 15j

Pretilts of alignment layers with fluorinated substitution.
Results are set forth in Table 4 of FIG. 28.

Thus, the present inventors have demonstrated that the invention anisotropic alignment surfaces yield uniform homeotropic or tilted and non-tilted planar alignment of compounds on substrates. The preferred invention process is a very simple process and effective for different substrate surfaces.

Also, the aligning layer is heat- and light-stable, can be made colorless, provides excellent contrast, few to no defects, may be made very thin and may be chemically bonded to the substrate. The present process has several important features: it is a simple, largely room temperature process which is easy to scale-up for manufacture, in a preferred embodiment it yields a chemically bonded alignment layer ensuring long term stability, and is applicable to substrates used in twisted nematic devices, super-twisted nematic devices, active matrix devices, etc.

The invention alignment surfaces are useful in all optical recording media and devices and, in particular, in liquid crystal devices (LCD) which require aligning substrates. These devices include displays, spatial light modulators, phase shifting devices, non-linear optical devices, twisted nematic devices, supertwisted nematic devices, double layer supertwisted nematic devices, triple layer supertwisted nematic devices, active matrix displays, multiplexed versions of the above-described devices, in-plane-switching (IPS) devices, vertical alignment displays, surface stabilized ferroelectric liquid crystal displays (SSFLCD), electroclinic displays, etc. Of course, flat panel displays, TV screens, computer screens, etc. are included. These devices are all well known in the art, and several of these devices are described in *Handbook of Display Technology*, Castellano J. A., Academic Press, Inc., 1992, incorporated herein by reference. Chapter 8 of this handbook is particularly useful. The art worker can provide the above-listed LC devices according to the present invention by simply substituting the surface alignment layer described herein for the alignment layer(s) used in prior art devices. Tilt angles provided by the invention surfaces vary from OE to 90E, and are preferably from greater than zero to 15°, including 1, 2, 3, 4, 5, 6, 7, 8, 9, 10, 11, 12, 13, 14 and 15°, 20°, 30°, 40°, 45°, 50°, 60°, 70°, 80° and 85° tilts may also be provided, as well as all values and ranges therebetween.

In devices that require display areas with patterns, etc., the above surfaces can be directionally linked through a mask, etc., to provide only certain areas with the invention aligning surface, or compounds of formula 1 can be applied to only certain areas of a substrate. Further, a mask may be used to directionally link certain areas using, e.g. polarized UV light polarized in a first direction followed by directionally linking other areas of the same substrate with, e.g., polarized UV light which is polarized in a second direction. Multi-domain pixels may be made in this fashion, etc. Of course, mixtures of compounds of formula 1 can be used on a single substrate, and substrates with domains of different compounds of formula 1 can be used. Colored substrates can be used, as well as colored, fluorescent, etc. compounds of formula 1 made so by their chemical constitution. Additives such as dyes, etc. can be added to the invention layers before or after directional linking.

The liquid crystal materials oriented by the invention surfaces are not particularly limited and include those exhibiting nematic, cholesteric, smectic, discotic, etc. phases, including ferroelectric materials (particularly those with lateral fluorine substitution). The liquid crystals may be used singly or in mixture, including eutectic mixtures. Superfluorinated nematic mixtures may be used. Compositions of two or more different liquid crystals are preferred. Examples of liquid crystals and their mixtures are described in *Liquid Crystals in Tabellen*, Vols. I and II incorporated herein by reference, and in U.S. Pat. No. 5,032,009, incorporated herein by reference, etc. Guest host compositions are also included wherein mixtures of liquid crystal(s) with, e.g., dyes, nonlinear optical compounds, etc. are provided.

In particularly preferred embodiments of the present invention the aligning surface is chiral, whether because formula 1 molecules are chiral, the P–P' linkage is chiral, X is chiral, P is chiral, S is chiral, combinations of these, etc. Form and geometrical chirality are included.

Obviously, numerous modifications and variations of the present invention are possible in light of the above teachings. It is therefore to be understood that, within the scope of the appended claims, the invention may be practiced otherwise than as specifically described herein.

What is claimed is:

1. A substrate having on at least a portion of a surface thereof a chemisorbed anisotropic directionally linked layer comprising a compound of the formula:

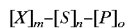

wherein X is a chemical functional group capable of chemisorption to said substrate, S is a spacer group separating X and P, and P is a directionally linkable group, and n, m and o are all integers greater than or equal to 1, wherein $m \geq n$ and $o \geq n$, wherein P has the formula (I)

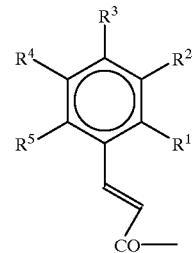

wherein each of $R^1$, $R^2$, $R^3$, $R^4$, and $R^5$ is independently H, linear or branched $C_nH_{2n+1}$, linear or branched $OC_nH_{2n+1}$, or $NO_2$, where n is an integer of 1 to 8, and where at least one of $R^1$, $R^2$, $R^3$, $R^4$, and $R^5$ is not H.

2. A substrate having on at least a portion of a surface thereof a chemisorbed anisotropic directionally linked layer comprising a compound of the formula:

wherein X is a chemical functional group capable of chemisorption to said substrate, S is a spacer group separating X and P, and P is a directionally linkable group, and m and o of the formula $[X]_m-[S]_n-[P]_o$ are all integers greater than or equal to 1, n of that formula 1 is zero or an integer greater than or equal to 1, wherein $m \geq n$ and $o \geq n$, and wherein P has the following formula (IA):

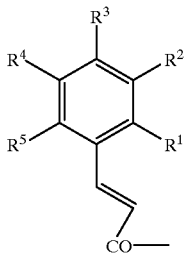

(IA)

wherein each of $R^1$, $R^2$, $R^3$, $R^4$, and $R^5$ is H, Br, Cl, F, $CF_3$, CN, NC, linear or branched and racemic or chiral —$CO_2C_nH_{2n+1}$, linear or branched and racemic or chiral $C_nH_{2n+1}$, linear or branched and racemic or chiral $OC_nH_{2n+1}$, $OCH_2C_nF_{2n+1}$, $NO_2$ or OH, where n of such $R^1$–$R^5$ groups is an integer of 1 to 12, and wherein at least one of $R^1$, $R^2$, $R^3$, $R^4$, and $R^5$ is not H.

3. The substrate of claim 1 or 2, wherein said chemisorbed layer comprises two or more compounds of the formula $[X]_m$–$[S]_n$–$[P]_o$.

4. The substrate of claim 1 or 2, wherein said chemisorbed layer does not absorb light in the visible wavelength range.

5. The substrate of claim 1 or 2, wherein said chemisorbed layer absorbs lights in the visible wavelength range.

6. The substrate of claim 1 or 2, wherein said chemisorbed layer is formed in a pattern.

7. The substrate of claim 1 or 2, wherein said chemisorbed layer is capable of homeotropically aligning liquid crystalline molecules in contact therewith.

8. The substrate of claim 1, wherein said chemisorbed layer is capable of aligning liquid crystalline molecules in contact therewith in a uniaxial planar orientation, said liquid crystalline molecules being optionally tilted from 3 to 85° with respect to the substrate surface.

9. The substrate of claim 1 or 2, wherein said chemisorbed layer is capable of aligning liquid crystalline molecules in contact therewith in a uniaxial planar orientation, said liquid crystalline molecules being optionally tilted from 0 to 9° with respect to the substrate surface.

10. A liquid crystal device comprising the substrate of claim 1 or 2.

11. A liquid crystal display device comprising the substrate of claim 1 or 2.

12. The substrate as claimed in claim 1 or 2 wherein said substrate is selected from the group consisting of $SiO_2$ glass, ITO-coated $SiO_2$ glass, polysilicon, metal, plastic ITO-coated glass with a passivation layer containing $SiO_2$ on top or below the ITO layer, ITO-coated borosilicate, ITO-coated borosilicate with a passivation layer containing $SiO_2$ on top or below the ITO layer, ITO-coated plastic and ITO-coated plastic with passivation layer containing $SiO_2$ on top or below the ITO layer.

13. The substrate as claimed in claim 1 or 2, wherein said substrate comprises a one domain or two domain or multi-domain pixel having a first $[X]_m$–$[S]_n$–$[P]_o$ compound in a first portion of said pixel and a second $[X]_m$–$[S]_n$–$[P]_o$ compound in a second portion of said pixel.

14. The substrate of claim 1 or 2, wherein the substrate comprises a one domain or two domain or multipixel domain pixel having the same compound $[X]_m$–$[S]_n$–$[P]_o$.

15. A phase modulator comprising the substrate of claim 1 or 2.

16. A non-linear optical device comprising the substrate of claim 1 or 2.

17. A spatial light modulator comprising the substrate of claim 1 or 2.

18. A method of preparing the substrate of claim 1 or 2, comprising the steps of chemisorbing a compound of the formula 1 on at least a portion of a surface of a substrate, followed by directional linking.

19. The method as claimed in claim 18, wherein directional linking is accomplished with light radiation.

20. The method as claimed in claim 18, wherein said directional linking comprises treatment with circularly or elliptically polarized UV light.

21. The method as claimed in claim 18, wherein said directional linking comprises treatment with linearly polarized UV light.

22. The method of claim 18, wherein the directional linking comprises treatment with linearly, circularly or elliptically polarized UV light and a pretilt is provided by a single exposure or multiple exposure at normal incidence.

23. The method of claim 18, wherein the directional linking comprises treatment with linearly, circularly or elliptically polarized UV light and a pretilt is provided by a single exposure or multiple exposure at oblique incidence.

24. The method of claim 18, wherein the directional linking comprises treatment with linearly, circularly or elliptically polarized UV light and a pretilt is provided by a multiple exposure and a combination of nornal and oblique incidence.

25. The method of claim 18, wherein the directional linking comprises treatment with linearly, circularly or elliptically polarized UV light and a pretilt is provided by a single exposure or multiple exposure at normal or oblique incidence or a combination thereof with a variation of the state of polarization during different exposures.

26. The substrate of claim 1, where m=n=o=1.

27. A compound of the formula 1

$$[X]_m\text{–}[S]_n\text{–}[P]_o \qquad 1$$

in which

X is a chemical functional group capable of adsorption, absorption, or chemisorption to a surface or a substrate, S is a spacer group, and P is a directionally linkable group of the formula (I):

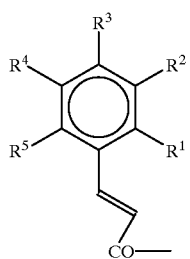

(I)

wherein each of $R^1$, $R^2$, $R^3$, $R^4$, and $R^5$ is independently H, linear or branched $C_nH_{2n+1}$, linear or branched $OC_nH_{2n+1}$, or $NO_2$, where n of such $R^1$–$R^5$ groups is an integer of 1 to 8, provided that not all of $R^1$, $R^2$, $R^3$, $R^4$, and $R^5$ are H, and n, m, and o of formula 1 are all integers greater than or equal to 1, and m≧n of formula 1 and o≧n of formula 1;

or P is a directionally linkable group of the following formula (IA):

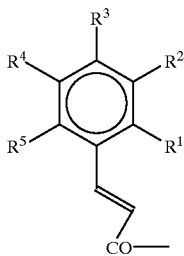

(IA)

wherein each of $R^1$, $R^2$, $R^3$, $R^4$, and $R^5$ is H, Br, Cl, F, $CF_3$, CN, NC, linear or branched and racemic or chiral $-CO_2C_nH_{2n+1}$, linear or branched and racemic or chiral $C_nH_{2n+1}$, linear or branched and racemic or chiral $OC_nH_{2n+1}$, $OCH_2C_nF_{2n+1}$, $NO_2$ or OH, where n of such $R^1$–$R^5$ groups is an integer of 1 to 12, and m and o of formula 1 are each integers greater than or equal to 1, and n of formula 1 is either 0 or an integer greater than or equal to 1, and m of formula 1 $\geq$ n of formula 1 and o of formula 1 $\geq$ n of formula 1.

28. A compound of claim 27, wherein X is a group of the formula $-Si(OH)_3$, $-SiR_2OH$, or $SiR_3$, where R is a $C_{1-10}$ alkoxy group, and S is a single bond;

a linear $C_{1-30}$ alkylene group;

a linear $C_{2-30}$ alkylene group interrupted by one or more aromatic groups, peptide groups, heterocyclic groups, NH, NR where R is a $C_1$–$C_{18}$ hydrocarbon group, O, S, COO, $SO_n$ where n is 1–4, CO, phosphorous, phosphine, phosphate, or phosphite groups;

a branched $C_{3-30}$ alkylene group; or a branched $C_{3-30}$ alkylene group interrupted by one or more aromatic groups, peptide groups, heterocyclic groups, NH, NR where R is a $C_1$–$C_{18}$ hydrocarbon group, O, S, COO, $SO_n$ where n is 1–4, CO, phosphorous, phosphine, phosphate, or phosphite groups.

29. A compound of claim 27, wherein X is a group of the formula $-Si(OH)_3$, $-SiR_2OH$, or $SiR_3$, $SiCl_3$, $SiRCl_2$, $Si(R)_2Cl$, where R is a $C_{1-10}$ alkyl group or a $C_{1-10}$ alkoxy group, and S is a single bond;

a linear $C_{1-30}$ alkylene group;

a linear $C_{2-30}$ alkylene group interrupted by one or more aromatic groups, peptide groups, heterocyclic groups, NH, NR where R is a $C_1$–$C_{18}$ hydrocarbon group, O, S, COO, $SO_n$ where n is 1–4, CO, phosphorous, phosphine, phosphate, or phosphite groups;

a branched $C_{3-30}$ alkylene group; or a branched $C_{3-30}$ alkylene group interrupted by one or more aromatic groups, peptide groups, heterocyclic groups, NH, NR where R is a $C_1$–$C_{18}$ hydrocarbon group, O, S, COO, $SO_n$ where n is 1–4, CO, phosphorous, phosphine, phosphate, or phosphite groups.

* * * * *